US011431207B2

(12) United States Patent
Tachiwa

(10) Patent No.: US 11,431,207 B2
(45) Date of Patent: Aug. 30, 2022

(54) POWER RECEPTION APPARATUS, POWER TRANSMISSION APPARATUS, CONTROL METHOD, AND STORAGE MEDIUM

(71) Applicant: CANON KABUSHIKI KAISHA, Tokyo (JP)

(72) Inventor: Wataru Tachiwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/239,393

(22) Filed: Apr. 23, 2021

(65) Prior Publication Data

US 2021/0242725 A1 Aug. 5, 2021

Related U.S. Application Data

(63) Continuation of application No. PCT/JP2019/040205, filed on Oct. 11, 2019.

(30) Foreign Application Priority Data

Oct. 31, 2018 (JP) .............................. JP2018-205863

(51) Int. Cl.
*H02J 50/80* (2016.01)
*H02J 7/00* (2006.01)
*H02J 50/10* (2016.01)

(52) U.S. Cl.
CPC .......... *H02J 50/80* (2016.02); *H02J 7/00045* (2020.01); *H02J 50/10* (2016.02)

(58) Field of Classification Search
CPC ......... H02J 50/80; H02J 7/00045; H02J 50/10
USPC ....................................................... 307/149
See application file for complete search history.

(56) References Cited

U.S. PATENT DOCUMENTS

| 2009/0001932 | A1* | 1/2009 | Kamijo ................... H02J 50/90 320/108 |
| 2012/0007554 | A1* | 1/2012 | Kanamori ............... B60L 53/65 320/109 |
| 2013/0257364 | A1 | 10/2013 | Redding | |
| 2014/0009109 | A1* | 1/2014 | Lee ......................... H02J 7/007 320/108 |

(Continued)

FOREIGN PATENT DOCUMENTS

| EP | 2685601 A2 | 1/2014 |
| JP | 2010-104097 A | 5/2010 |

(Continued)

*Primary Examiner* — Alfonso Perez Borroto
(74) *Attorney, Agent, or Firm* — Canon U.S.A., Inc. I.P. Division

(57) ABSTRACT

In a case where a power reception apparatus 101 is capable of communicating with a power transmission apparatus 102 using a second communication unit 207 configured to perform communication faster than communication performed by a first communication unit 206, the power reception apparatus 101 performs authentication on the power transmission apparatus 102 using the second communication unit 207. In a case where the power reception apparatus 101 is incapable of communicating with the power transmission apparatus 102 using the second communication unit 207, the power reception apparatus 101 performs the authentication on the power transmission apparatus 102 using a communication unit configured to perform communication slower than the communication performed by the second communication unit 207.

47 Claims, 15 Drawing Sheets

(56) References Cited

U.S. PATENT DOCUMENTS

| | | | | |
|---|---|---|---|---|
| 2015/0006395 A1* | 1/2015 | Chu | ........................ | H02J 50/10 |
| | | | | 705/44 |
| 2016/0172895 A1* | 6/2016 | Lee | ........................ | H02J 7/04 |
| | | | | 320/108 |
| 2016/0365747 A1* | 12/2016 | Redding | .................. | H02J 50/80 |
| 2019/0310388 A1* | 10/2019 | Park | ........................ | H02J 7/02 |

FOREIGN PATENT DOCUMENTS

| | | |
|---|---|---|
| JP | 2011-151717 A | 8/2011 |
| JP | 2014-212603 A | 11/2014 |
| JP | 2015-8554 A | 1/2015 |
| JP | 2015-515851 A | 5/2015 |
| JP | 2016-007116 A | 1/2016 |
| JP | 2017-510233 A | 4/2017 |
| JP | 2018-57266 A | 4/2018 |
| WO | 2013/076803 A1 | 5/2013 |
| WO | 2014/034966 A1 | 3/2014 |
| WO | 2018/147090 A1 | 8/2018 |

* cited by examiner

POWER RECEPTION APPARATUS, POWER TRANSMISSION APPARATUS, CONTROL METHOD, AND STORAGE MEDIUM

CROSS-REFERENCE TO RELATED APPLICATIONS

This application is a Continuation of International Patent Application No. PCT/JP2019/040205, filed Oct. 11, 2019, which claims the benefit of Japanese Patent Application No. 2018-205863, filed Oct. 31, 2018, both of which are hereby incorporated by reference herein in their entireties.

BACKGROUND

Field

The present disclosure relates to a power reception apparatus, a power transmission apparatus, a control method, and a storage medium.

Background Art

In recent years, a technique for a wireless power transmission system such as a contactless charging system is widely developed. Patent literature 1 discusses a power transmission apparatus and a power reception apparatus compliant with a standard formulated by a contactless charging standards body called the Wireless Power Consortium (WPC) (hereinafter referred to as the "WPC standard"). Patent literature 2 discusses a technique in which, before power transmission is performed, device authentication is performed between a power transmission apparatus and a power reception apparatus that perform contactless charging. According to patent literature 2, the power transmission apparatus transmits challenge data to the power reception apparatus via a power transmission coil, and the power reception apparatus transmits response data generated by performing authentication calculation on the challenge data to the power transmission apparatus via a power reception coil. Then, if the power transmission apparatus receives the response data transmitted from the power reception apparatus, the power transmission apparatus executes device authentication by a verification process using verification data and transmits power based on the result of the device authentication.

CITATION LIST

Patent Literature

PTL 1: Japanese Patent Application Laid-Open No. 2016-007116
PTL 2: Japanese Patent Application Laid-Open No. 2010-104097

However, in a case where device authentication is performed via a power transmission coil and a power reception coil, and power transmission is started based on the result of the device authentication, the start of the power transmission may be delayed, and convenience for a user may be impaired. That is, if a power transmission apparatus and a power reception apparatus each have the function of performing high-speed communication, but perform device authentication through low-speed communication, convenience for a user is impaired.

SUMMARY

In view of the above issue, the present disclosure is directed to performing device authentication using appropriate communication.

According to an aspect of the present disclosure, a power reception apparatus includes a power reception unit configured to wirelessly receive power from a power transmission apparatus, a plurality of communication units including at least a first communication unit configured to communicate with the power transmission apparatus, and a second communication unit configured to perform communication faster than the communication performed by the first communication unit, an authentication unit configured to perform authentication on the power transmission apparatus; and a selection unit configured to, in a case where the power reception apparatus is capable of communicating with the power transmission apparatus using the second communication unit, select the second communication unit as a communication unit to be used for the authentication unit to perform the authentication, and in a case where the power reception apparatus is incapable of communicating with the power transmission apparatus using the second communication unit, select a communication unit configured to perform communication slower than the communication performed by the second communication unit as the communication unit to be used for the authentication unit to perform the authentication, wherein the power reception unit receives power based on a result of the authentication performed using the communication unit selected by the selection unit.

Further features of the present disclosure will become apparent from the following description of exemplary embodiments with reference to the attached drawings.

DESCRIPTION OF THE EMBODIMENTS

With reference to the drawings, exemplary embodiments of the present disclosure will be described below. The following exemplary embodiments are merely examples for describing the technical idea of the present disclosure, and are not intended to limit the invention to configurations and methods described in the exemplary embodiments.

First Exemplary Embodiment (Configuration of System)

Figure 1:
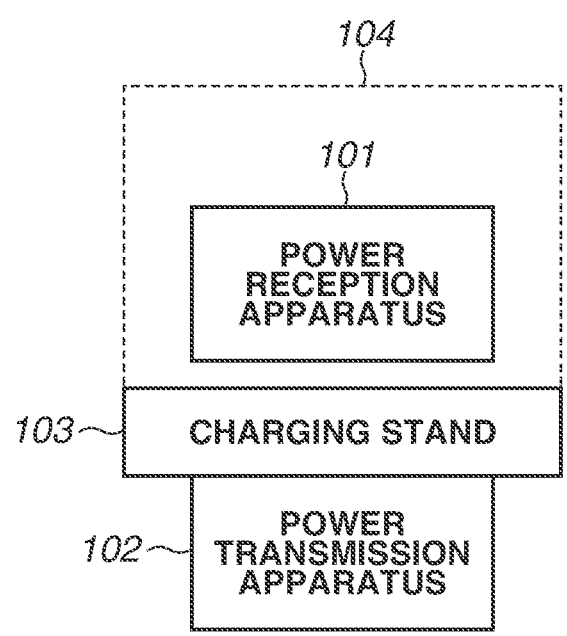
FIG. 1 is a diagram illustrating a configuration of a contactless charging system.

FIG. 1 illustrates an example of the configuration of a contactless charging system (a wireless power transmission system) according to the present exemplary embodiment. This system includes a power reception apparatus 101 and a power transmission apparatus 102. Hereinafter, a power reception apparatus will occasionally be referred to as an "RX", and a power transmission apparatus will occasionally be referred to as a "TX". The TX 102 is an electronic device that wirelessly transmits power to the RX 101 placed on a charging stand 103. The RX 101 is an electronic device that receives power wirelessly transmitted from the TX 102 and charges a built-in battery. A description is given below using as an example a case where the RX 101 is placed on the charging stand 103. The RX 101, however, may not need to be placed on the charging stand 103 so long as the RX 101 is present within a power transmittable range 104 of the TX 102 when the TX 102 transmits power to the RX 101.

Each of the RX 101 and the TX 102 can have the function of executing an application other than a contactless charging application. An example of the RX 101 is a smartphone, and an example of the TX 102 is an accessory device for charging the smartphone. Each of the RX 101 and the TX 102 may be a storage device such as a hard disk device or a memory device, or may be an information processing apparatus such as a personal computer (PC). Each of the RX 101 and the TX 102 may be an image input apparatus such as an imaging apparatus (a camera or a video camera) or a scanner, or may be an image output apparatus such as a printer, a copying machine, or a projector.

Although a single RX 101 and a single TX 102 are illustrated in the present exemplary embodiment, the present exemplary embodiment can also be applied to a configuration in which a single TX 102 or different TXs 102 transmit power to a plurality of RXs 101.

In this system, based on the Wireless Power Consortium (WPC) standard, wireless power transmission using an electromagnetic induction method for contactless charging is performed. That is, the RX 101 and the TX 102 perform wireless power transmission for contactless charging based on the WPC standard between a power reception coil of the RX 101 and a power transmission coil of the TX 102. A wireless power transmission method (a contactless power transmission method) applied to this system is not limited to a method defined by the WPC standard, and may be another electromagnetic induction method, a magnetic field resonance method, an electric field resonance method, a microwave method, or a method using a laser. Although the wireless power transmission is used for contactless charging in the present exemplary embodiment, the wireless power transmission may be performed for use other than contactless charging.

The WPC standard defines the magnitude of power guaranteed when the RX 101 receives power from the TX 102, as a value termed guaranteed power (hereinafter referred to as "GP"). For example, the GP indicates the power value of power guaranteed to be output to a load (e.g., a circuit for charging) in the RX 101 even if the positional relationship between the RX 101 and the TX 102 changes and the power transmission efficiency between the power reception coil and the power transmission coil decreases. For example, in a case where the GP is 5 watts, and even if the positional relationship between the power reception coil and the power transmission coil changes and the power transmission efficiency decreases, the TX 102 transmits power by performing control so that 5 watts can be output to the load in the RX 101.

The RX 101 and the TX 102 according to the present exemplary embodiment perform communication for power transmission/reception control based on the WPC standard and communication for device authentication. First, the communication for power transmission/reception control based on the WPC standard is described. The WPC standard defines a plurality of phases including the power transfer phase where power is transmitted, and phases before the power is actually transmitted, and communication for power transmission/reception control required in each phase is performed. The phases before the power is transmitted include the selection phase, the ping phase, the identification and configuration phase, the negotiation phase, and the calibration phase. Hereinafter, the identification and configuration phase will be referred to as the "I & C phase".

In the selection phase, the TX 102 intermittently transmits an analog ping and detects that an object is placed on the charging stand 103 (e.g., the RX 101 or a conductor piece is placed on the charging stand 103). The TX 102 detects at least either one of the voltage value and the current value of the power transmission coil when power with the analog ping is transmitted. If the voltage value falls below a certain threshold, or if the current value exceeds a certain threshold, the TX 102 determines that an object is present. Then, the TX 102 transitions to the ping phase.

In the ping phase, the TX 102 transmits a digital ping having power greater than that of the analog ping. The magnitude of the digital ping is sufficient power for a control unit of the RX 101 placed on the charging stand 103 to start. The RX 101 notifies the TX 102 of the magnitude of a power reception voltage. As described above, the TX 102 receives a response from the RX 101 having received the digital ping, thereby recognizing that the object detected in the selection phase is the RX 101. If the TX 102 receives the notification of the power reception voltage value, the TX 102 transitions to the I & C phase.

In the I & C phase, the TX 102 identifies the RX 101 and acquires device configuration information (capability information) from the RX 101. To this end, the RX 101 transmits an identification (ID) packet and a configuration packet to the TX 102. The ID packet includes identification information regarding the RX 101, and the configuration packet includes device configuration information (capability information) regarding the RX 101. Receiving the ID packet and the configuration packet, the TX 102 responds with an acknowledgement (ACK). Then, the I & C phase ends.

In the negotiation phase, based on the value of the GP requested by the RX 101 and the power transmission capability of the TX 102, the value of the GP is determined.

In the calibration phase, based on the WPC standard, the RX 101 notifies the TX 102 of the value of received power, and the TX 102 makes an adjustment for efficiently transmitting power.

In the power transfer phase, control for starting and continuing the transmission of power, and stopping the transmission of power due to an error or full charge is performed.

The TX 102 and the RX 101 perform this communication for power transmission/reception control through communication (hereinafter referred to as "first communication") for superimposing a signal on transmission power based on the WPC standard and using an antenna (coil) that is the same as that in the wireless power transmission. The range where the TX 102 and the RX 101 can perform the first communication based on the WPC standard with each other is almost similar to the power transmittable range of the TX 102. In FIG. 1, the power transmittable range 104 indicates the range where the wireless power transmission and the first communication can be performed between the power transmission coil of the TX 102 and the power reception coil of the RX 101.

Prior to the determination of the GP, the RX 101 according to the present exemplary embodiment performs challenge-response communication using an electronic certificate with the TX 102, thereby performing device authentication on the TX 102. That is, the RX 101 performs the communication for device authentication. In the present exemplary embodiment, based on the result of the device authentication, the RX 101 determines the GP that the RX 101 is to request from the TX 102 in the negotiation phase. To this end, the device authentication needs to be completed before the negotiation phase.

The RX 101 requests the TX 102 that is successful in the device authentication to set the GP to 15 watts, and requests the TX 102 that is not successful in the device authentication to set the GP to 5 watts. The GP is not limited to the combination of 15 watts and 5 watts, and may be the combination of any values so long as the GP of the TX 102 that is successful in the device authentication is greater than the GP of the TX 102 that is not successful in the device authentication. That is, the RX 101 requests only the TX 102 that is successful in the device authentication to transmit power to be received by the RX 101 with large GP. By thus determining the GP based on the result of the device authentication, the RX 101 can receive power with large GP from only the TX 102 that passes a predetermined test determined by the WPC standard and is recognized as capable of transmitting power with large GP. Examples of a case where the TX 102 is not successful in the device authentication include a case where the TX 102 does not have the function of performing the device authentication, and a case where the TX 102 has the function of performing the device authentication, but fails in the device authentication.

In the present exemplary embodiment, the RX 101 and the TX 102 perform the communication for device authentication through the first communication using an antenna that is the same as that in the wireless power transmission, or through communication (hereinafter referred to as "second communication") using an antenna and a frequency different from those in the wireless power transmission. In the second communication, communication faster than that in the first communication can be performed. Specifically, the frequency band of an electromagnetic wave used in the second communication is higher than that of an electromagnetic wave used in the first communication. In the present exemplary embodiment, if the TX 102 is capable of performing the second communication, the RX 101 performs device authentication using the second communication. If the TX 102 is incapable of performing the second communication, the RX 101 performs the device authentication using the first communication. This processing will be described below.

As an example, in the present exemplary embodiment, the second communication is performed using a communication method compliant with the Bluetooth (registered trademark) Low Energy (hereinafter referred to as "BLE") standard. The TX 102 operates as a peripheral role in BLE, and the RX 101 operates as a central role in BLE, but these roles in BLE may be reversed. The second communication may be performed using another communication method such as a wireless local area network (LAN) based on the Institute of Electrical and Electronics Engineers (IEEE) 802.11 standard series (e.g., Wi-Fi (registered trademark)), ZigBee, or near-field communication (NFC). When the TX 102 is capable of performing the second communication, and the RX 101 is present within the power transmittable range 104, the RX 101 and the TX 102 can exchange information through the second communication.

(Configurations of Apparatuses)

Next, the configurations of the power reception apparatus 101 (the RX 101) and the power transmission apparatus 102 (the TX 102) according to the present exemplary embodiment are described. The configurations described below are merely examples, and part (or all in some cases) of the described configurations may be replaced with another configuration that serves another similar function, or may be omitted, and a further configuration may be added to the described configurations. Further, a single block illustrated in the following description may be divided into a plurality of blocks, or a plurality of blocks may be integrated into a single block.

Figure 2:
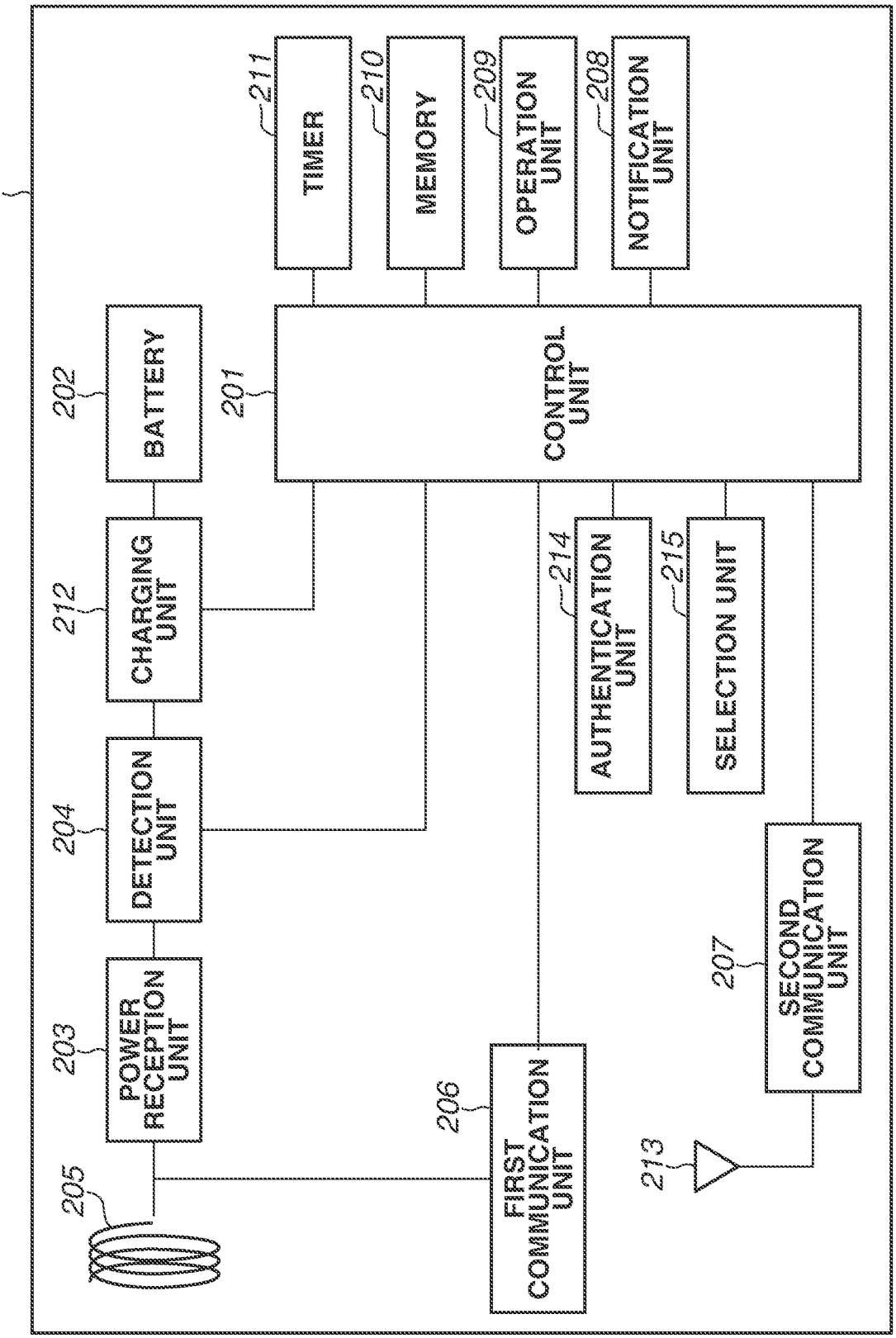
FIG. 2 is a diagram illustrating an example of a configuration of a power reception apparatus according to a first exemplary embodiment.

FIG. 2 is a diagram illustrating an example of the configuration of the RX 101 according to the present exemplary embodiment. The RX 101 includes a control unit 201, a battery 202, a power reception unit 203, a detection unit 204, a power reception coil 205, a first communication unit 206, a second communication unit 207, a notification unit 208, an operation unit 209, a memory 210, a timer 211, a charging unit 212, and a communication antenna 213. Further, the RX 101 includes an authentication unit 214, a selection unit 215, and a determination unit 216.

For example, the control unit 201 executes a control program stored in the memory 210, thereby controlling the entirety of the RX 101. That is, the control unit 201 controls the function units illustrated in FIG. 2. The control unit 201 performs control regarding power reception control including the communication for device authentication in the RX 101. Further, the control unit 201 may perform control for executing an application other than a wireless power transmission application. The control unit 201 includes one or more processors such as a central processing unit (CPU) and a micro processing unit (MPU). The control unit 201 may include hardware dedicated to a specific process, such as an application-specific integrated circuit (ASIC). The control unit 201 may include an array circuit such as a field-programmable gate array (FPGA) compiled to execute a predetermined process. The control unit 201 stores, in the memory 210, information that is to be stored during the execution of various processes. The control unit 201 can measure time using the timer 211. The control unit 201 may have the function of a determination unit that determines whether the RX 101 is capable of communicating with the TX 102 via the second communication unit 207.

The battery 202 supplies power required for control of the RX 101 by the control unit 201, power reception, and communication to the entirety of the RX 101. The battery 202 stores power received via the power reception coil 205.

In the power reception coil 205, an induced electromotive force is generated by an electromagnetic wave emitted from a power transmission coil 305 of the TX 102, and the power reception unit 203 acquires power generated in the power reception coil 205. The power reception unit 203 acquires alternating current power generated by electromagnetic induction in the power reception coil 205. Then, the power reception unit 203 converts the alternating current power into direct current power or alternating current power of a predetermined frequency and outputs the power to the charging unit 212 that performs a process for charging the battery 202. That is, the power reception unit 203 supplies the power to a load in the RX 101. The above GP is the amount of power guaranteed to be output from the power reception unit 203.

Based on the WPC standard, the detection unit 204 detects that the RX 101 is placed on the charging stand 103. For example, the detection unit 204 detects at least either one of the voltage value and the current value of the power reception coil 205 when the power reception unit 203 receives power with a digital ping in the WPC standard via the power reception coil 205. For example, if the voltage value falls below a predetermined voltage threshold, or if the current value exceeds a predetermined current threshold, the detection unit 204 can determine that the RX 101 is placed on the charging stand 103.

The first communication unit 206 performs the above control communication based on the WPC standard with the TX 102. The first communication unit 206 demodulates an electromagnetic wave input from the power reception coil 205, thereby acquiring information transmitted from the TX 102. Then, the first communication unit 206 performs load modulation on the electromagnetic wave, thereby superimposing information that is to be transmitted to the TX 102 on the electromagnetic wave. Consequently, the first communication unit 206 performs the first communication with the TX 102. That is, the first communication performed by the first communication unit 206 is performed so as to be superimposed on an electromagnetic wave transmitted from the power reception coil of the TX 102.

The second communication unit 207 performs the second communication using the communication antenna 213 different from the power reception coil 205. As described above, the second communication is communication faster than the first communication. Specifically, the frequency band of an electromagnetic wave used in the second communication is higher than that of an electromagnetic wave used in the first communication. The second communication unit 207 performs the communication for device authentication with the TX 102. In addition to this, the second communication unit 207 may perform communication other than the communication for device authentication. For example, the second communication unit 207 includes a modulation/demodulation circuit and a communication protocol processing function that are required to perform communication compliant with the BLE standard. Instead of the first communication unit 206, the second communication unit 207 may perform communication regarding power reception control other than the communication for device authentication.

The notification unit 208 notifies a user of information by any technique such as a visual, auditory, or tactile technique. For example, the notification unit 208 notifies the user of the charging state of the RX 101 or the state regarding the power transmission of the wireless power transmission system including the TX 102 and the RX 101 in FIG. 1. For example, the notification unit 208 includes a liquid crystal display, a light-emitting diode (LED), a loudspeaker, a vibration generation circuit, and another notification device.

The operation unit 209 has a reception function of receiving an operation of the user on the RX 101. For example, the operation unit 209 includes a button, a keyboard, a voice input device such as a microphone, a motion detection device such as an acceleration sensor or a gyro sensor, and another input device. Alternatively, a device obtained by integrating the notification unit 208 and the operation unit 209 as in a touch panel may be used.

As described above, the memory 210 stores various pieces of information such as identification information and device configuration information, and a control program. The memory 210 may store information obtained by a function unit different from the control unit 201. The timer 211 measures time using, for example, a count up timer that measures the time elapsed from the clock time when the count up timer is started, or a count down timer that counts down from a set time.

The authentication unit 214 performs device authentication on the TX 102 through communication via the first communication unit 206 or the second communication unit 207. In the present exemplary embodiment, the "device authentication" refers to authentication using information regarding the above electronic certificate. The selection unit 215 selects either one of the first communication unit 206 and the second communication unit 207 as a communication unit for use in the device authentication to be performed by the authentication unit 214. Based on the result of this selection by the selection unit 215, the control unit 201 controls the communication unit for use in the device authentication.

Figure 3:
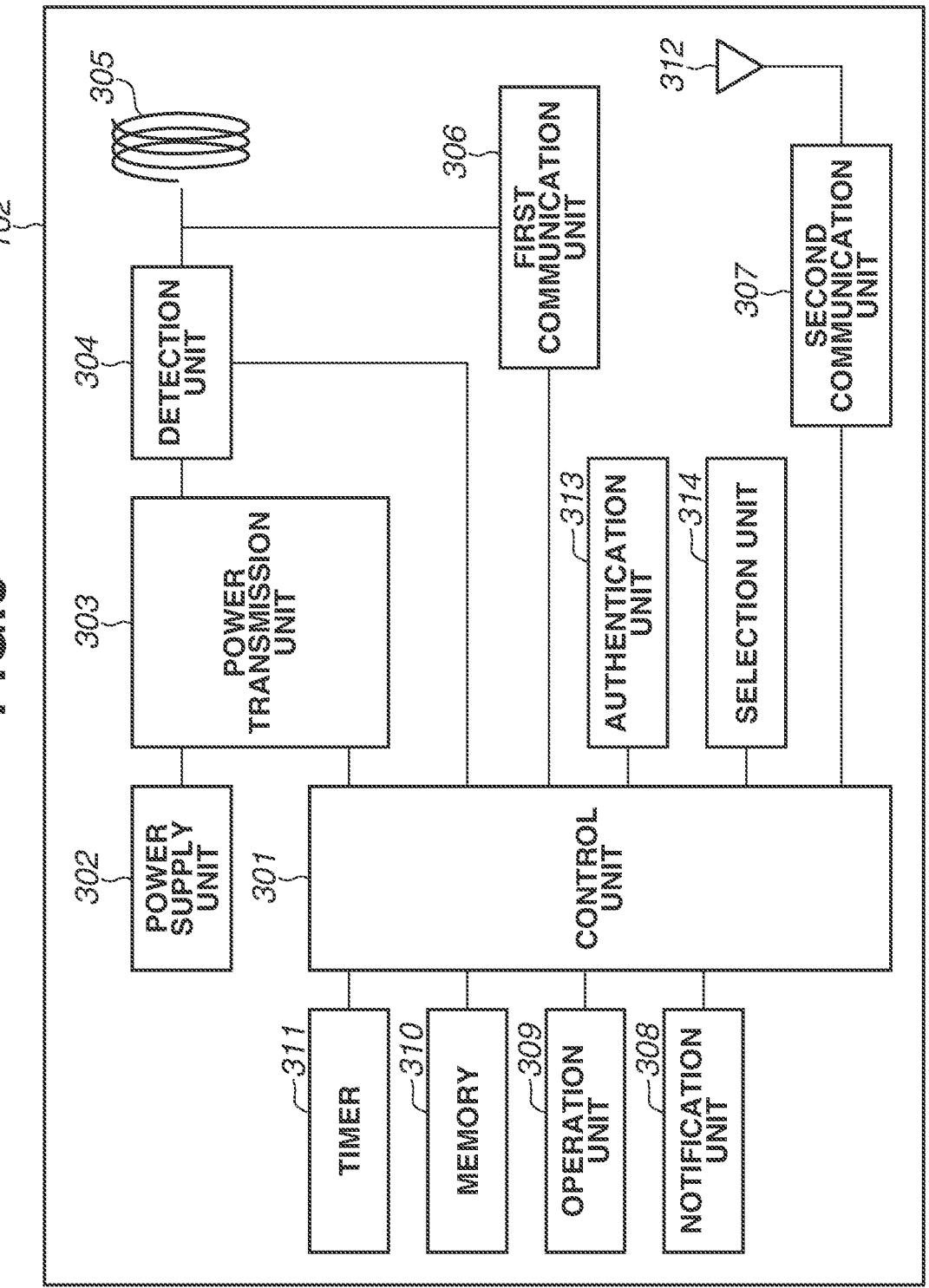
FIG. 3 is a diagram illustrating an example of a configuration of a power transmission apparatus according to the first exemplary embodiment.

FIG. 3 is a diagram illustrating an example of the configuration of the TX 102 according to the present exemplary embodiment. As an example, the TX 102 includes a control unit 301, a power supply unit 302, a power transmission unit 303, a detection unit 304, a power transmission coil 305, a first communication unit 306, a second communication unit 307, a notification unit 308, an operation unit 309, a memory 310, a timer 311, and a communication antenna 312. The TX 102 also includes an authentication unit 313 and a selection unit 314.

For example, the control unit 301 executes a control program stored in the memory 310, thereby controlling the entirety of the TX 102. That is, the control unit 301 controls the function units illustrated in FIG. 3. The control unit 301 performs control regarding power transmission control including the communication for device authentication in the TX 102. Further, the control unit 301 may perform control for executing an application other than the wireless power transmission application. The control unit 301 includes one or more processors such as a CPU and an MPU. The control unit 301 may include hardware dedicated to a specific process, such as an application-specific integrated circuit (ASIC), or an array circuit such as an FPGA compiled to execute a predetermined process. The control unit 301 stores, in the memory 310, information that is to be stored during the execution of various processes. The control unit 301 can measure time using the timer 311. The control unit 301 may have the function of a determination unit that determines whether the TX 102 is capable of communicating with the RX 101 via the second communication unit 307.

The power supply unit 302 supplies power required for control of the TX 102 by the control unit 301, power transmission, and communication to the entirety of the TX 102. The power supply unit 302 is, for example, a commercial power supply or a battery. The battery stores power supplied from a commercial power supply.

The power transmission unit 303 converts direct current power or alternating current power input from the power supply unit 302 into alternating current frequency power in a frequency band for use in the wireless power transmission and inputs the alternating current frequency power to the power transmission coil 305, thereby generating an electromagnetic wave with which to cause the RX 101 to receive power. The frequency of the alternating current power generated by the power transmission unit 303 is, for example, about several hundreds of kilohertz (e.g., 110 kHz to 205 kHz) and is different from, for example, the communication frequency (2.4 GHz) of BLE used in the second communication. Based on an instruction from the control unit 301, the power transmission unit 303 inputs alternating current frequency power to the power transmission coil 305 to cause the power transmission coil 305 to output an electromagnetic wave with which to transmit power to the RX 101. The power transmission unit 303 adjusts one or both of a voltage (a power transmission voltage) or a current (a power transmission current) to be input to the power transmission coil 305, thereby controlling the intensity of the electromagnetic wave to be output. If the power transmission voltage or the power transmission current is increased, the intensity of the electromagnetic wave strengthens. If the power transmission voltage or the power transmission current is decreased, the intensity of the electromagnetic wave weakens. Based on an instruction from the control unit 301, the power transmission unit 303 controls the output of the alternating current frequency power so that the transmission of power from the power transmission coil 305 is started or stopped.

Based on the WPC standard, the detection unit 304 detects whether an object is placed on the charging stand 103. Specifically, the detection unit 304 detects whether an object is placed on an interface surface of the charging stand 103. For example, the detection unit 304 detects at least one of the voltage value and the current value of the power transmission coil 305 when the power transmission unit 303 transmits power with an analog ping in the WPC standard via the power transmission coil 305. The detection unit 304 may detect a change in the impedance of the power transmission coil 305. Then, if the voltage falls below a predetermined voltage value, or if the current value exceeds a predetermined current value, the detection unit 304 can determine that an object is placed on the charging stand 103. The determination of whether this object is the power reception apparatus or a foreign substance other than the power reception apparatus is made based on the presence or absence of a predetermined response to a digital ping subsequently transmitted from the first communication unit 306 through the first communication. That is, if the TX 102 receives the predetermined response, it is determined that this object is the power reception apparatus. If not, it is determined that this object is an object other than the power reception apparatus.

The first communication unit 306 performs the above control communication based on the WPC standard with the RX 101. The first communication unit 306 modulates an electromagnetic wave output from the power transmission coil 305 and transmits information to the RX 101, thereby performing the first communication. The first communication unit 306 demodulates an electromagnetic wave output from the power transmission coil 305 and modulated by the RX 101, thereby acquiring information transmitted from the RX 101. That is, the first communication performed by the first communication unit 306 is perform so as to be superimposed on an electromagnetic wave transmitted from the power transmission coil 305.

The second communication unit 307 performs the second communication using the communication antenna 312 different from the power transmission coil 305. As described above, the second communication is communication faster than the first communication. Specifically, the frequency band of an electromagnetic wave used in the second communication is higher than that of an electromagnetic wave used in the first communication. The second communication unit 307 performs the communication for device authentication with the RX 101. In addition to this, the second communication unit 307 may perform communication other than the communication for device authentication. For example, the second communication unit 307 includes a modulation/demodulation circuit and a communication protocol processing function that are required to perform communication compliant with the BLE standard. Instead of the first communication unit 306, the second communication unit 307 may perform communication regarding power transmission control other than the communication for device authentication.

The notification unit 308 notifies a user of information by any technique such as a visual, auditory, or tactile technique. For example, the notification unit 308 notifies the user of information indicating the charging state of the TX 102 or the state regarding the power transmission of the wireless power transmission system including the TX 102 and the RX 101 in FIG. 1. For example, the notification unit 308 includes a liquid crystal display, an LED, a loudspeaker, a vibration generation circuit, and another notification device.

The operation unit 309 has a reception function of receiving an operation of the user on the TX 102. For example, the operation unit 309 includes a button, a keyboard, a voice input device such as a microphone, a motion detection device such as an acceleration sensor or a gyro sensor, and another input device. Alternatively, a device obtained by integrating the notification unit 308 and the operation unit 309 as in a touch panel may be used.

The memory 310 stores various pieces of information such as information indicating that the TX 102 is capable of performing the second communication, and a control program. The memory 310 may store information obtained by a function unit different from the control unit 301. The timer 311 measures time using, for example, a count up timer that measures the time elapsed from the clock time when the count up timer is started, or a count down timer that counts down from a set time.

The authentication unit 313 functions to be subjected to device authentication by the RX 101 through communication via the first communication unit 306 or the second communication unit 307. The authentication unit 313 may have the function of be subjected to device authentication by the RX 101. The selection unit 314 selects either one of the first communication unit 306 and the second communication unit 307 as a communication unit for use in the device authentication to be performed by the authentication unit 313. Based on the result of this selection by the selection unit 314, the control unit 301 controls the communication unit for use in the device authentication.

Figure 4:
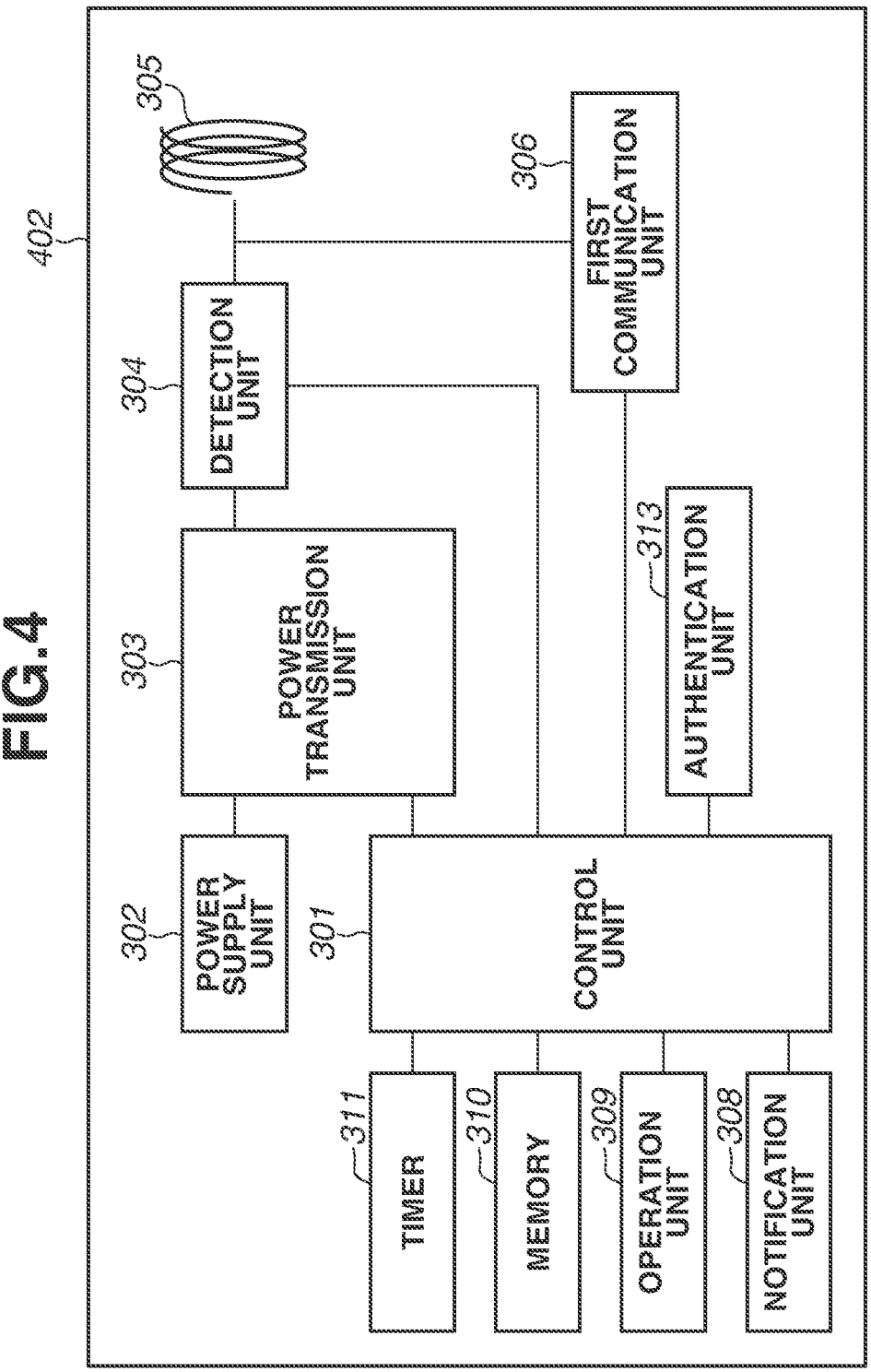
FIG. 4 is a diagram illustrating an example of a configuration of another power transmission apparatus according to the first exemplary embodiment.

FIG. 4 is a diagram illustrating an example of the configuration of a TX 402, which is another TX according to the present exemplary embodiment. The TX 402 is different from the TX 102 illustrated in FIG. 3 in that the TX 402 does not include a second communication unit and a selection unit. Since the TX 402 does not include a second communication unit, the TX 402 performs device authentication with the RX 101 through the first communication via the power transmission coil 305. The other components are similar to those of the TX 102 described with reference to FIG. 3.

(Flow of Processing)

Next, an example of the flow of processing executed by the RX 101 and the TX 102 is described.

[Processing by Power Reception Apparatus]

Figure 5:
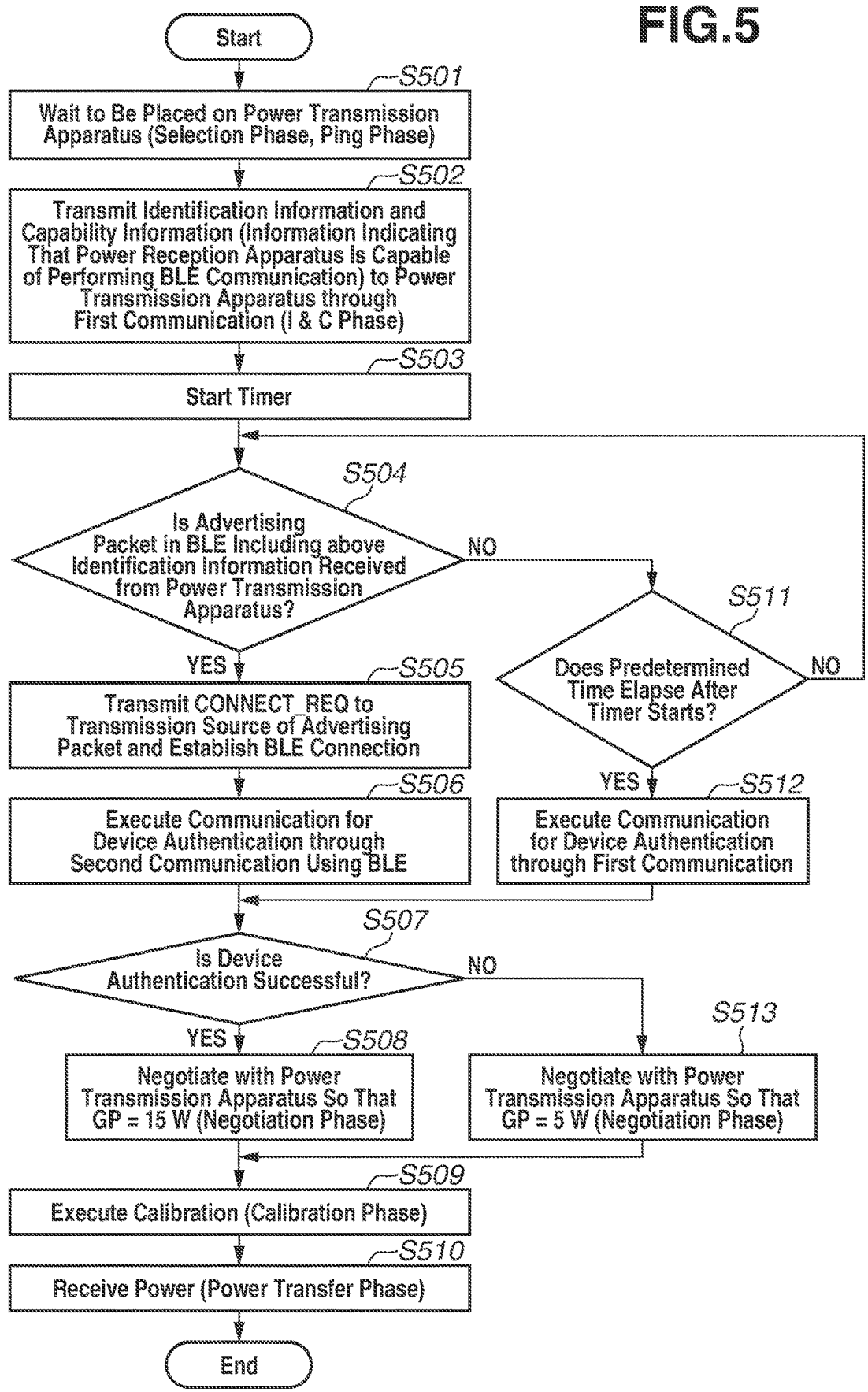
FIG. 5 is a flowchart illustrating an example of a flow of processing by the power reception apparatus according to the first exemplary embodiment.

FIG. 5 is a flowchart illustrating an example of the flow of processing executed by the RX 101. This processing can be achieved by, for example, the control unit 201 of the RX 101 executing a program read from the memory 210. At least a part of the following procedure may be achieved by hardware. The hardware in this case can be achieved by, for example, using a predetermined compiler to automatically generate a dedicated circuit that uses a gate array circuit such as an FPGA according to a program for achieving processing steps. This processing can be executed according to the fact that the RX 101 is powered on, according to the fact that the RX 101 starts by the feeding of power from the battery 202 or the TX 102, or according to the fact that the user of the RX 101 inputs an instruction to start the contactless charging application. Alternatively, this processing may be started using another trigger.

After processing regarding power transmission and reception is started, then in step S501, the RX 101 executes processing defined as the selection phase and the ping phase in the WPC standard and waits to be placed on the TX 102. Then, for example, the RX 101 detects a digital ping from the TX 102, thereby detecting that the RX 101 is placed on the charging stand 103 of the TX 102. Then, if the RX 101 detects the digital ping, the RX 101 transmits a signal strength packet (a power reception voltage value) to the TX 102.

If the RX 101 detects that the RX 101 is placed on the charging stand 103 of the TX 102, then in step S502, the RX 101 executes processing defined as the I & C phase in the WPC standard and transmits identification information and device configuration information (capability information) to the TX 102 through the first communication.

Figure 10A:
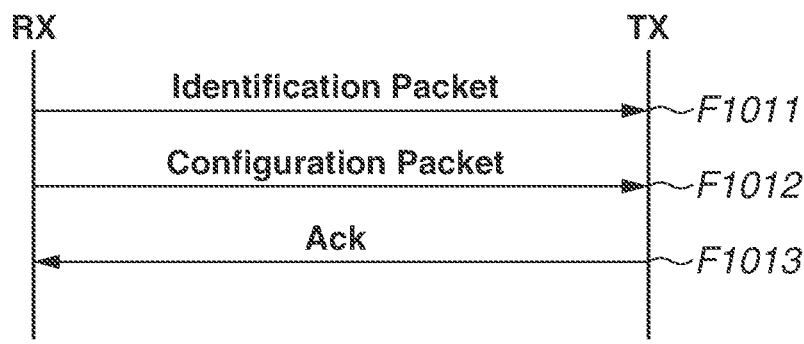
FIG. 10A is a diagram illustrating a communication sequence in an identification and configuration (I & C) phase.

FIG. 10A illustrates the flow of communication in the I & C phase. In the I & C phase, in step F1011, the RX 101 transmits an identification packet (an ID packet) to the TX 102. The ID packet stores a manufacturer code and a basic device ID, which are identification information regarding each individuality of the RX 101, and also an information element that allows the specifying of a version of the WPC standard with which the RX 101 is compatible, as capability information regarding the RX 101.

In step F1012, the RX 101 further transmits a configuration packet to the TX 102. The configuration packet includes the following information as capability information regarding the RX 101. That is, the capability information is a maximum power value that is a value for specifying the maximum power that the RX 101 can supply to a load, and information indicating whether the RX 101 has the negotiation function in the WPC standard. At this time, the RX 101 transmits the capability information by including information indicating that the RX 101 is capable of performing BLE communication. The information indicating that the RX 101 is capable of performing BLE communication is transmitted by being included in the ID packet, the configuration packet, or another packet. The communication method for the second communication is not limited to BLE, and may be another method. In the present exemplary embodiment, a description is given using BLE as an example. In the I & C phase, the RX 101 can also notify the TX 102 that the RX 101 has the function of performing device authentication. For example, the RX 101 can transmit the ID packet, the configuration packet, or another packet by including information indicating that the RX 101 has the function of performing device authentication.

If the TX 102 receives these packets, then in step F1013, the TX 102 transmits ACK, and the I & C phase ends. Alternatively, the RX 101 may notify the TX 102 of the identification information and the device configuration information (the capability information) regarding the RX 101 using a method other than the communication in the I & C phase in the WPC standard. Alternatively, the identification information regarding each individuality of the RX 101 may be a wireless power ID or a Bluetooth address (hereinafter referred to as "BD_ADDR") specific to the second communication unit 207 of the RX 101. The identification information regarding each individuality of the RX 101 may be any other identification information that allows the identification of the individuality of the RX 101. As the capability information, information other than the above may be included.

Next, referring back to FIG. 5, in step S503, the RX 101 starts measuring time using the timer. During a predetermined time, the RX 101 waits for an advertising packet in BLE including the identification information regarding the RX 101 transmitted in step S502 (NO in step S504 and NO in step S511). At this time, the TX 102 transmits an advertising packet by including the identification information regarding the RX 101 transmitted from the RX 101 through the first communication in step S502. For example, it is defined that the AD type of an advertising packet in BLE is set to a predetermined value, thereby indicating that this packet includes the identification information regarding the RX 101. That is, it is defined in advance that if the AD type is the predetermined value, AD data includes the identification information regarding the RX 101. Then, this definition is shared between the TX 102 and the RX 101, whereby the RX 101 can wait for an advertising packet including the identification information regarding the RX 101.

If the RX 101 receives an advertising packet including the identification information regarding the RX 101 (YES in step S504), then in step S505, the RX 101 transmits CONNECT_REQ, which is a connection request for a BLE connection, to BD_ADDR included in a header portion of the advertising packet. Then, the RX 101 and the TX 102 establish a BLE connection with each other. That is, by the processes of steps S504 and S505, the RX 101 can establish a BLE connection with the TX 102 on which the RX 101 is placed. Consequently, the RX 101 and the TX 102 can perform the second communication via the communication antenna 213 and the communication antenna 312. Alternatively, the advertising packet may include another piece of information instead of the identification information regarding the RX 101, and based on this information, the RX 101 may be able to recognize that the TX 102 on which the RX 101 is placed transmits the advertising packet. In this case, the control unit 201 determines that the TX 102 is capable of performing the second communication with the second communication unit 207. Then, the selection unit 215 selects the second communication unit 207 as a communication unit for performing device authentication. That the TX 102 is capable of performing the second communication means that the TX 102 is in the state where the TX 102 is capable of performing the second communication. On the other hand, that the TX 102 is incapable of performing the second communication means that the TX 102 does not have the function of performing the second communication, or that the TX 102 has the function of performing the second communication, but is in the state where the function is off.

Figure 10B:
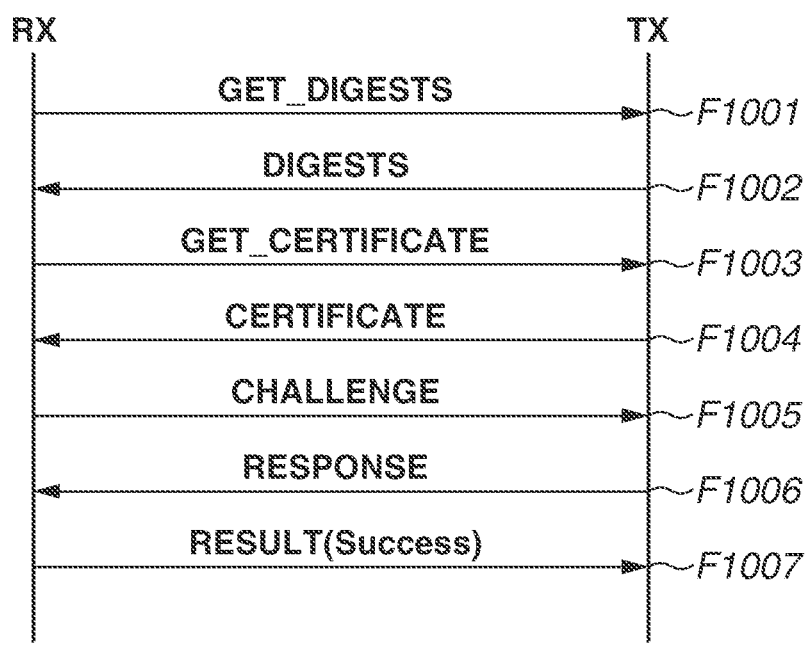
FIG. 10B is a diagram illustrating a communication sequence for device authentication.

Next, in step S506, the authentication unit 214 of the RX 101 performs device authentication with the TX 102 through the second communication using the BLE connection established above. With reference to FIG. 10B, the content of the communication for device authentication performed between the RX 101 and the TX 102 is described. The device authentication according to the present exemplary embodiment is challenge-response device authentication using an electronic certificate, and the RX 101 authenticates the TX 102. Alternatively, the TX 102 may authenticate the RX 101, or both the TX 102 and the RX 101 may authenticate each other.

The RX 101 operates as an initiator that transmits a challenge text to the TX 102, and the TX 102 operates as a responder that encrypts the challenge text received from the RX 101 and transmits the encrypted challenge text to the RX 101. First, in step F1001, the RX 101 as the initiator transmits a GET_DIGESTS message to the TX 102 as the responder. The GET_DIGESTS is a message that requests information regarding an electronic certificate owned by a device that receives the GET_DIGESTS (the TX 102). In step F1002, in response to the GET_DIGESTS, the TX 102 transmits DIGESTS to the RX 101. The DIGESTS is information regarding an electronic certificate owned by a device that transmits the DIGESTS (the TX 102).

Next, in step F1003, the RX 101 transmits to the TX 102 a GET_CERTIFICATE message that requests detailed information regarding the electronic certificate. In step F1004, in response to the GET_CERTIFICATE from the RX 101, the TX 102 transmits CERTIFICATE to the RX 101. Then, in step F1005, the RX 101 transmits a CHALLENGE message including a challenge text to the TX 102. In step F1006, the TX 102 transmits RESPONSE obtained by encrypting the challenge text received from the RX 101 to the RX 101. If the validity of the RESPONSE received from the TX 102 is confirmed, then in step F1007, the RX 101 transmits RESULT (success) to the TX 102, and the device authentication ends. The RESULT (success) means that the validity of the RESPONSE is confirmed and the device authentication is successful. If the device authentication fails, RESULT (fail) is transmitted instead of the RESULT (success), and the device authentication process ends.

If the initiator (the RX 101) receives a message indicating that the partner apparatus (the TX 102) does not have the function of performing the device authentication, the initiator (the RX 101) determines that the partner apparatus is incompatible with the device authentication. If the initiator (the RX 101) does not receive a response in the middle of the communication, the initiator (the RX 101) may preform retry by retransmitting a message for obtaining the response, or may determine that the partner apparatus is incompatible with the device authentication. The RX 101 may not perform the communication for device authentication with the TX 102 incompatible with the device authentication, and may not determine that the result of the device authentication is successful.

In GATT (Generic Attribute Profile) communication through the BLE connection, the above messages are transmitted and received by any of the characteristics, such as read, write, notify, and indicate, of a GATT service defined in advance. The GATT communication is performed by transmitting and receiving a packet standardized in BLE.

If the communication for device authentication is completed, the RX 101 transmits LL_TERMINATE_IND in BLE, thereby terminating the BLE connection. That is, the second communication via the second communication unit 207 ends. Alternatively, the TX 102 may terminate the BLE connection. In a case where the BLE connection is used by another application, the BLE connection may not be terminated even after the communication for device authentication ends. Prior to the communication for device authentication, based on the advertising packet in BLE or the GATT communication, the RX 101 can acquire information indicating whether the TX 102 is compatible with the device authentication. Then, if the TX 102 is not compatible with the device authentication, the RX 101 may determine that the TX 102 is incompatible with the device authentication, and may not execute the communication in FIG. 10B.

Referring back to FIG. 5, if, on the other hand, the RX 101 does not receive the above advertising packet even though the predetermined time elapses after step S503 (NO in step S504 and YES in step S511), the control unit 201 determines that the TX 102 on which the RX 101 is placed is incapable of performing BLE communication. Then, the selection unit 215 selects the first communication unit 206 as a communication unit to be used to perform the device authentication. In step S512, the authentication unit 214 performs the communication for device authentication described with reference to FIG. 10B with the TX 102 via the first communication unit 206. At this time, messages to be exchanged in the communication for device authentication are transmitted and received as packets in the first communication to and from the TX 102 and the RX 101.

After executing the device authentication using the second communication or the first communication, the RX 101 negotiates with the TX 102 based on the result of the device authentication. If the device authentication is successful (YES in step S507), then in step S508, the RX 101 performs the negotiation so that the GP is 15 watts. On the other hand, if not (NO in step S507), then in step S513, the RX 101 performs the negotiation so that the GP is 5 watts. The negotiation is performed through the first communication via the first communication unit 206. If, however, the TX 102 is capable of performing the second communication, the RX 101 may also perform control communication for the negotiation and further, the following calibration and power reception through the second communication.

Figure 10C:
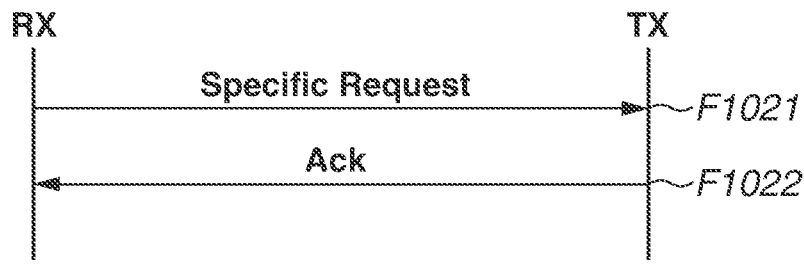
FIG. 10C is a diagram illustrating a communication sequence in a negotiation phase.

In this negotiation, communication in the negotiation phase in the WPC standard as illustrated in FIG. 10C is performed. First, in step F1021, the RX 101 transmits a specific request to the TX 102, thereby notifying the TX 102 of the value of the GP requested by the RX 101. That is, if the device authentication is successful, the RX 101 notifies the TX 102 that the GP=15 watts. If not, the RX 101 notifies the TX 102 that the GP=5 watts. Based on the power transmission capability of the TX 102, the TX 102 determines whether the TX 102 accepts the request. In step F1022, if the TX 102 accepts the request, the TX 102 transmits ACK (a positive response) to the RX 101. If the TX 102 does not accept the request, the TX 102 transmits NACK (a negative response) to the RX 101. In FIG. 10C, an example is illustrated where the TX 102 transmits ACK.

If the magnitude of the GP requested by the RX 101 is the magnitude of power that can be transmitted with the power transmission capability of the TX 102, the TX 102 accepts the request from the RX 101. At this time, the value of the GP is determined as a value that is the same as that requested by the RX 101. If, on the other hand, the magnitude of the GP requested by the RX 101 is a magnitude that cannot be accomplished with the power transmission capability of the TX 102, the TX 102 does not accept the request from the RX 101. In this case, for example, a predetermined value defined in advance by the WPC standard can be determined as the value of the GP. Alternatively, another predetermined value may be determined as the value of the GP. As an example, these predetermined values are stored in advance in the memory 210 of the RX 101 and the memory 310 of the TX 102.

If the TX 102 can simultaneously transmit power to a plurality of RXs 101 and is already transmitting power to another RX 101, the TX 102 may determine the value of the GP based on the current power transmission margin of the TX 102 instead of the power transmission capability of the TX 102.

Although the GP is determined by performing the negotiation in step S508 or S513, the present disclosure is not limited to this. That is, not only through the communication in the negotiation phase in the WPC standard, but also based on the result of the device authentication between the TX 102 and the RX 101, another procedure for determining the GP may be executed. Specifically, if the device authentication is not successful, the GP may be set to a predetermined value determined in advance. If the TX 102 acquires information indicating that the RX 101 is not compatible with the negotiation phase (e.g., in step S502), the TX 102 may not perform the negotiation, and may set the value of the GP to a predetermined value (e.g., defined in advance by the WPC standard).

After the GP is determined, then in step S509, the RX 101 performs calibration based on the determined GP. The "calibration" refers to a process in which, regarding power transmitted from the TX 102 to the RX 101, the TX 102 adjusts the correlation between the value of the power measured inside the TX 102 and the value of the received power measured inside the RX 101. The TX 102 performs this process by processing in the calibration phase in the WPC standard.

Then, in step S510, the RX 101 receives power. The power reception is performed by processing in the power transfer phase in the WPC standard. The power reception may be performed up to full charge, or may end at any timing. The calibration and the power reception in steps S509 and S510 can use known techniques, and therefore are not described in detail here. The calibration and the power reception may be performed using methods other than those based on the WPC standard.

If full charge is reached in the power transfer phase, the RX 101 transmits end power transfer in the WPC standard to the TX 102. Consequently, the transmission of power from the TX 102 is stopped, and the series of processes for contactless charging ends. After that, the RX 101 may be automatically powered off, and if the RX 101 is powered on next time, the processing may return to step S501. Or the RX 101 may wait for another start trigger, for example, using as a trigger the fact that the remaining amount of the battery decreases to a predetermined amount or less, and then, the processing may return to step S501.

If the second communication unit 207 cannot be used in the device authentication with the TX 102 for a reason such as the use of the second communication unit 207 by another application, the RX 101 may perform the device authentication with the TX 102 using the first communication unit 206. In step S502, the RX 101 may transmit the configuration packet to the TX 102 by including, in addition to the information indicating that the RX 101 is capable of performing BLE communication, information indicating whether the BLE communication can be used in the device authentication.

[Processing by Power Transmission Apparatus in FIG. 3]

Figure 6:
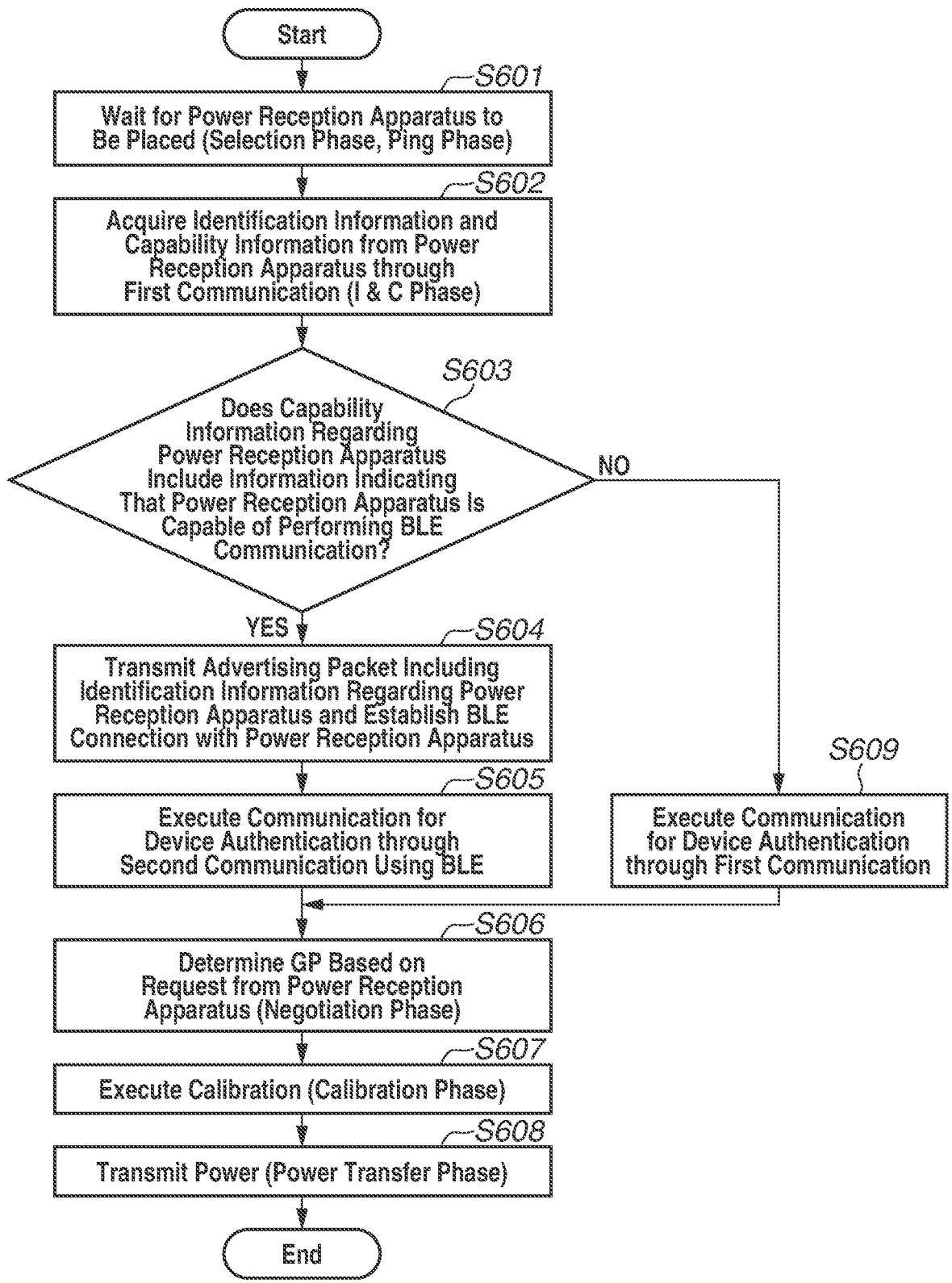
FIG. 6 is a flowchart illustrating an example of a flow of processing by the power transmission apparatus according to the first exemplary embodiment.

Next, with reference to FIG. 6, an example of the flow of processing executed by the TX 102 is described. This processing can be achieved by, for example, the control unit 301 of the TX 102 executing a program read from the memory 310. At least a part of the following procedure may be achieved by hardware. The hardware in this case can be achieved by, for example, using a predetermined compiler to automatically generate a dedicated circuit that uses a gate array circuit such as an FPGA according to a program for achieving processing steps. This processing can be executed according to the fact that the TX 102 is powered on, according to the fact that the user of the TX 102 inputs an instruction to start the contactless charging application, or according to the fact that the TX 102 is connected to commercial power supply and receives the supply of power. Alternatively, this processing may be started using another trigger.

In processing regarding power transmission and reception, first, in step S601, the TX 102 executes processing defined as the selection phase and the ping phase in the WPC standard and waits for the RX 101 to be placed. Specifically, the TX 102 repeatedly and intermittently transmits an analog ping in the WPC standard and detects the presence or absence of an object placed on the charging stand 103. Then, if the TX 102 detects that an object is placed on the charging stand 103, the TX 102 transmits a digital ping. Then, if a predetermined response (a signal strength packet) to the digital ping is received, the TX 102 determines that the detected object is the RX 101 and the RX 101 is placed on the charging stand 103.

If the TX 102 detects that the RX 101 is placed, then in step S602, the TX 102 executes the above communication in the I & C phase using the first communication unit 306 and acquires identification information and device configuration information (capability information) from the RX 101. Next, in step S603, the control unit 301 determines whether the acquired device configuration information (capability information) includes information indicating that the RX 101 is capable of performing BLE communication. If the device configuration information (the capability information) includes the information indicating that the RX 101 is capable of performing BLE communication (YES in step S603), then in step S604, the TX 102 transmits an advertising packet in BLE including the identification information regarding the RX 101. Then, the TX 102 establishes a connection in BLE with the RX 101 placed on the TX 102. The advertising packet transmitted from the TX 102 may not include the identification information regarding the RX 101, and may only need to be information that enables the RX 101 to recognize that the advertising packet is transmitted from the TX 102 on which the RX 101 is placed. Next, in step S605, using the BLE connection established above, the TX 102 performs the communication for device authentication with the RX 101 that is described with reference to FIG. 10B. That is, the selection unit 314 selects the second communication unit 307 as a communication unit for performing device authentication.

If, on the other hand, the device configuration information (the capability information) regarding the RX 101 does not include the information indicating that the RX 101 is capable of performing BLE communication (NO in step S603), the TX 102 does not transmit an advertising packet. Then, in step S609, using the first communication, the TX 102 performs the communication for device authentication described with reference to FIG. 10B. In the case of having the function of performing the second communication using BLE, but in the state where it is impossible to perform the second communication, the TX 102 may not transmit an advertising packet, and may perform the communication for device authentication using the first communication. In these cases, the selection unit 314 selects the first communication unit 306 as a communication unit for performing the device authentication.

Then, in step S606, the TX 102 performs the negotiation illustrated in FIG. 10C with the RX 101 via the first communication unit 306 and determines the GP. After the GP is determined, then in step S607, the TX 102 performs calibration based on the determined GP. Then, in step S608, the TX 102 transmits power to the RX 101.

If the TX 102 receives end power transfer in the WPC standard from the RX 101, the TX 102 ends the processing in any processing phase according to the WPC standard and returns to the selection phase in step S601. Also if full charge is reached, end power transfer is transmitted from the RX 101, and therefore, the TX 102 returns to the selection phase in step S601. If the second communication unit 307 can be used in the communication for the negotiation, the calibration, and the power transmission, the communication may be performed using the second communication unit 307.

[Processing by Power Transmission Apparatus in FIG. 4]

Figure 7:
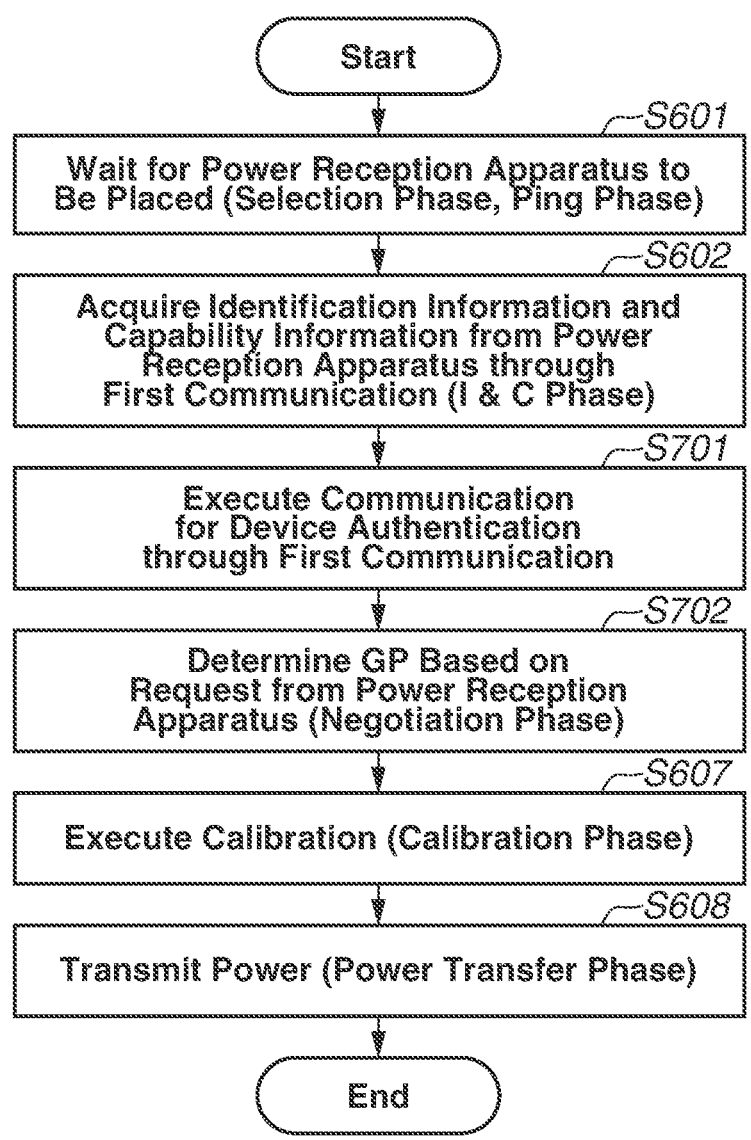
FIG. 7 is a flowchart illustrating an example of a flow of processing by another power transmission apparatus according to the first exemplary embodiment.

FIG. 7 is a flowchart illustrating an example of the flow of processing executed by the TX 402 in FIG. 4. The differences from the flowchart (FIG. 6) of the processing executed by the TX 102 in FIG. 3 are described. In FIG. 7, processes similar to the processes in FIG. 6 are designated by the same signs. In steps S601 and S602, processing similar to that of the TX 102 in FIG. 3 is executed.

Next, since the TX 402 in FIG. 4 does not have a second communication unit for performing BLE communication, then in step S701, the TX 402 always performs the communication for device authentication using the first communication unit 306, regardless of the presence or absence of information indicating that the RX 101 is capable of performing BLE communication, which is acquired in step S602. Then, in step S702, based on the GP requested by the power reception apparatus based on the result of device authentication, the TX 102 determines the GP. The subsequent processing is similar to the processing described with reference to FIG. 6.

[Operation of System]

Figure 8:
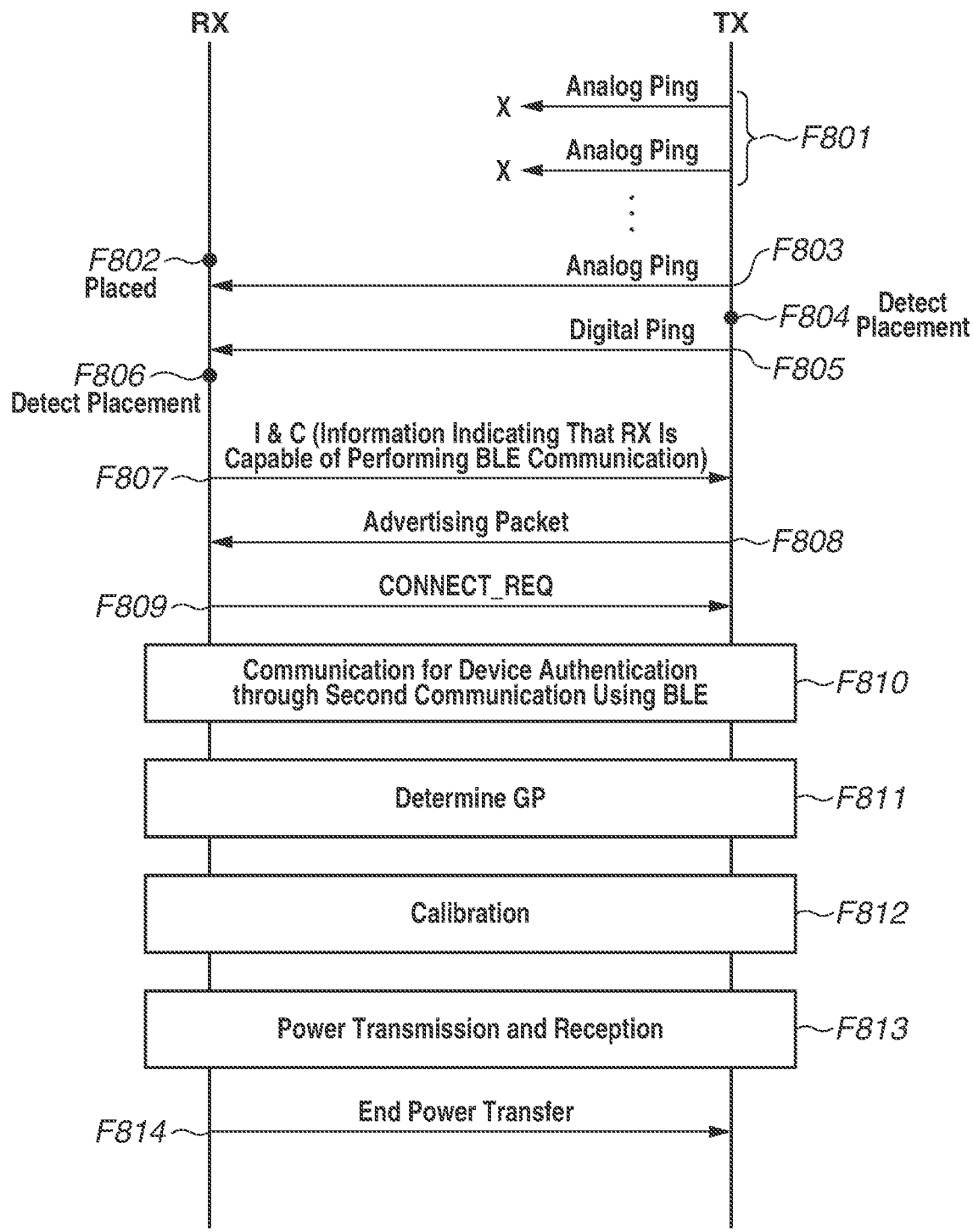
FIG. 8 is a diagram illustrating an example of a flow of processing executed in the contactless charging system.

With reference to FIG. 8, a description is given of the operation sequence of the RX 101 and the TX 102 in FIG. 3 that is described with reference to FIGS. 5 and 6. The TX 102 is the TX 102 including the second communication unit 307 and capable of performing the second communication using BLE. In FIG. 8, time elapses in the direction from top to bottom. The TX 102 is a device to be successful in device authentication by the RX 101 and further has a sufficient power transmission capability to transmit power corresponding to the GP requested by the RX 101. In an initial state, the RX 101 is not placed on the TX 102.

First, based on an analog ping, the TX 102 waits for an object to be placed (step S601, step F801). If the RX 101 is placed (step F802), the analog ping changes (step F803), and the TX 102 detects that an object is placed (step F804). Based on a subsequent digital ping, the RX 101 detects that the RX 101 is placed on the TX 102 (step F805, step F806). Based on a response to the digital ping, the TX 102 detects that the placed object is the RX 101. Next, through communication in the I & C phase, the RX 101 notifies the TX 102 of information indicating that the RX 101 is capable of performing BLE communication (step F807, step S502, step S602). In response, the TX 102 transmits an advertising packet in BLE (step F808). Then, the RX 101 transmits CONNECT_REQ (step F809), and a BLE connection is established (step S505, step S604).

Next, device authentication is performed through the second communication using BLE, and the device authentication is successful (step F810, step S506, step 605). Since the device authentication is successful, then based on negotiation, it is determined that the GP=15 watts (step F811, step S508, step S606). Then, calibration (step F812, step S509, step S607) and power transmission and reception (step F813, step S510, step S608) are performed. If full charge is reached, the RX 101 transmits end power transfer, and the processing ends (step F814). According to the above operation, if the RX 101 is placed on the TX 102 capable of performing the second communication using BLE, the RX 101 performs the communication for device authentication using BLE and succeeds in receiving power based on the result of the communication.

Next, with reference to FIG. 9, a description is given of the operation sequence of the RX 101 and the TX 402 in FIG. 4 that is described with reference to FIGS. 5 and 7. The TX 402 does not include a second communication unit and is incapable of performing the second communication using BLE. The TX 402 is also a device to be successful in device authentication performed by the RX 101. The differences from FIG. 8 are mainly described below.

Figure 9:
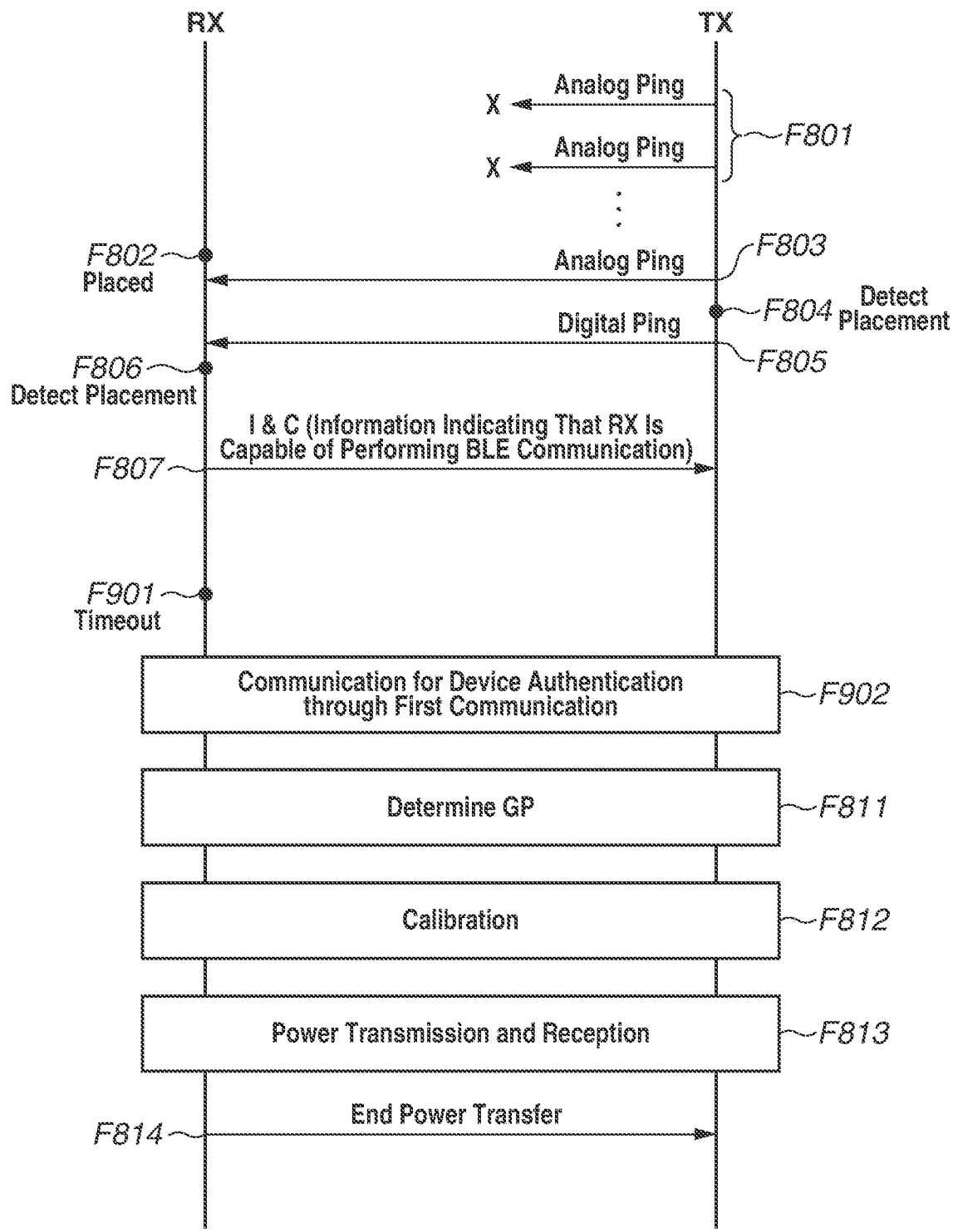
FIG. 9 is a diagram illustrating an example of a flow of processing executed in another contactless charging system.

In FIG. 9, communication in the selection phase and the I & C phase in steps F801 to F807 is similar to that in FIG. 8. After the I & C phase, the TX 402 does not transmit an advertising packet, and therefore, the RX 101 times out (step F901, YES in step S511), and device authentication is performed through the first communication and is successful (step F902, step S512, step S701). The subsequent operation is similar to that in FIG. 8. According to the above operation, if the RX 101 is placed on the TX 402 incapable of performing the second communication using BLE, the RX 101 can perform device authentication through the first communication and receive power based on the result of the device authentication.

That is, based on the descriptions with reference to FIGS. 8 and 9, the RX 101 according to the present exemplary embodiment can perform device authentication through the second communication with the TX 102 capable of performing the second communication, and can perform the device authentication through the first communication with the TX 402 incapable of performing the second communication. In the second communication, communication can be performed faster than in the first communication. Thus, the time required for the device authentication is shorter in a case where the second communication is used. Thus, depending on the power transmission apparatus, it is possible to shorten the time from the placement of the RX 101 to the start of charging.

The RX 101 according to the present exemplary embodiment is always capable of performing BLE communication. Alternatively, for example, in a case where the BLE communication function is being used in another process, or in a case where the remaining amount of the battery 202 is small, the RX 101 may not transmit the information indicating that the RX 101 is capable of performing BLE communication in step S502. Consequently, during the period when the RX 101 cannot temporarily use BLE communication for device authentication, the RX 101 may perform the device authentication through the first communication.

In the present exemplary embodiment, a description has been given on the assumption that a single type of communication method, namely BLE, is used as the second communication. The RX 101, however, may have the function of performing communication using a plurality of communication methods and use any of the plurality of communication methods as the second communication. In this case, the device configuration information (the capability information) transmitted in step S502 in FIG. 5 may include information indicating that the RX 101 is capable of performing communication using another communication method, in addition to the information indicating that the RX 101 is capable of performing BLE communication. Then, in this case, in step S504, the RX 101 may wait for a packet based on another communication method. A configuration may be employed in which, if the RX 101 receives packets based on a plurality of communication methods in step S504, the RX 101 executes device authentication using the communication method for the packet received first. Consequently, for example, whichever of the TX 102 capable of performing BLE communication and the TX 102 capable of performing Wi-Fi communication (which is faster than BLE, but has a larger battery consumption) the RX 101 is placed on, the RX 101 can execute device authentication in a short time using the second communication faster than the first communication.

According to the present exemplary embodiment, based on whether the TX 102 transmits an advertising packet, the RX 101 can determine whether the TX 102 is capable of performing BLE communication. Thus, the selection unit 215 can select either of the first communication unit 206 and the second communication unit 207 as a communication unit for performing device authentication.

In the present exemplary embodiment, a description has been given using as an example a case where each of the RX and the TX includes two communication units. The present disclosure, however, is not limited to this. Alternatively, each of the RX and the TX may include three or more communication units. For example, a configuration may be employed in which the RX includes three or more communication units. Then, a configuration may be employed in which the three or more communication units include a first communication unit, a second communication unit that performs communication faster than that performed by the first communication unit, and a third communication unit that performs communication faster than that performed by the first communication unit and slower than that performed by the second communication unit. In this case, if the RX cannot communicate with the TX via the second communication unit, but the third communication unit and the TX can communicate with each other, the selection unit may select the third communication unit. The same applies to a configuration in which the TX includes three or more communication units.

In a case where the RX includes two or more communication units that perform communication faster than that performed by a first communication unit, a second communication unit may be selected, for example, according to the remaining amount of the battery. Specifically, if the remaining amount of the battery is smaller than a threshold, among communication units capable of operating with power received by the power reception unit not via the battery and also capable of performing communication faster than that performed by a first communication unit, a communication unit capable of performing the fastest communication is selected as a second communication unit. Then, the RX determines whether the RX can communicate with the TX using the second communication unit. If, on the other hand, the remaining amount of the battery is greater than or equal to the threshold, among the communication units capable of performing communication faster than that performed by the first communication unit, the RX determines whether the RX can communicate with the TX using a communication unit capable of performing the fastest communication as the second communication unit, regardless of whether the communication units operate with the battery. The threshold is set according to power that enables the operation of the communication unit capable of performing the fastest communication among the communication units capable of performing communication faster than that performed by the first communication unit, regardless of whether the communication units operate with the battery.

In a case where there is a communication unit capable of performing communication faster than that performed by a second communication unit, but the battery consumption of this communication unit is larger than that of the second communication unit, and if the remaining amount of the battery is less than or equal to a predetermined value, the second communication unit may be selected. As described above, according to a predetermined condition (also including a condition other than the remaining amount of the battery), a communication unit having the fastest communication speed may not be selected, and a communication unit that performs communication as fast as possible may be selected. Specifically, in a configuration in which the RX includes a first communication unit, a second communication unit that performs communication faster than that performed by the first communication unit, and a third communication unit that performs communication faster than that performed by the first communication unit and the second communication unit, an authentication process may be performed using not the third communication unit but the second communication unit according to a predetermined condition. As a criterion for selecting a communication unit, the communication speed, the remaining amount of the battery, or the combination of these can be used. Alternatively, a communication unit compatible with a communication method determined by the WPC standard or a standard regarding another type of wireless power transmission may be preferentially used.

Second Exemplary Embodiment

Figure 11:
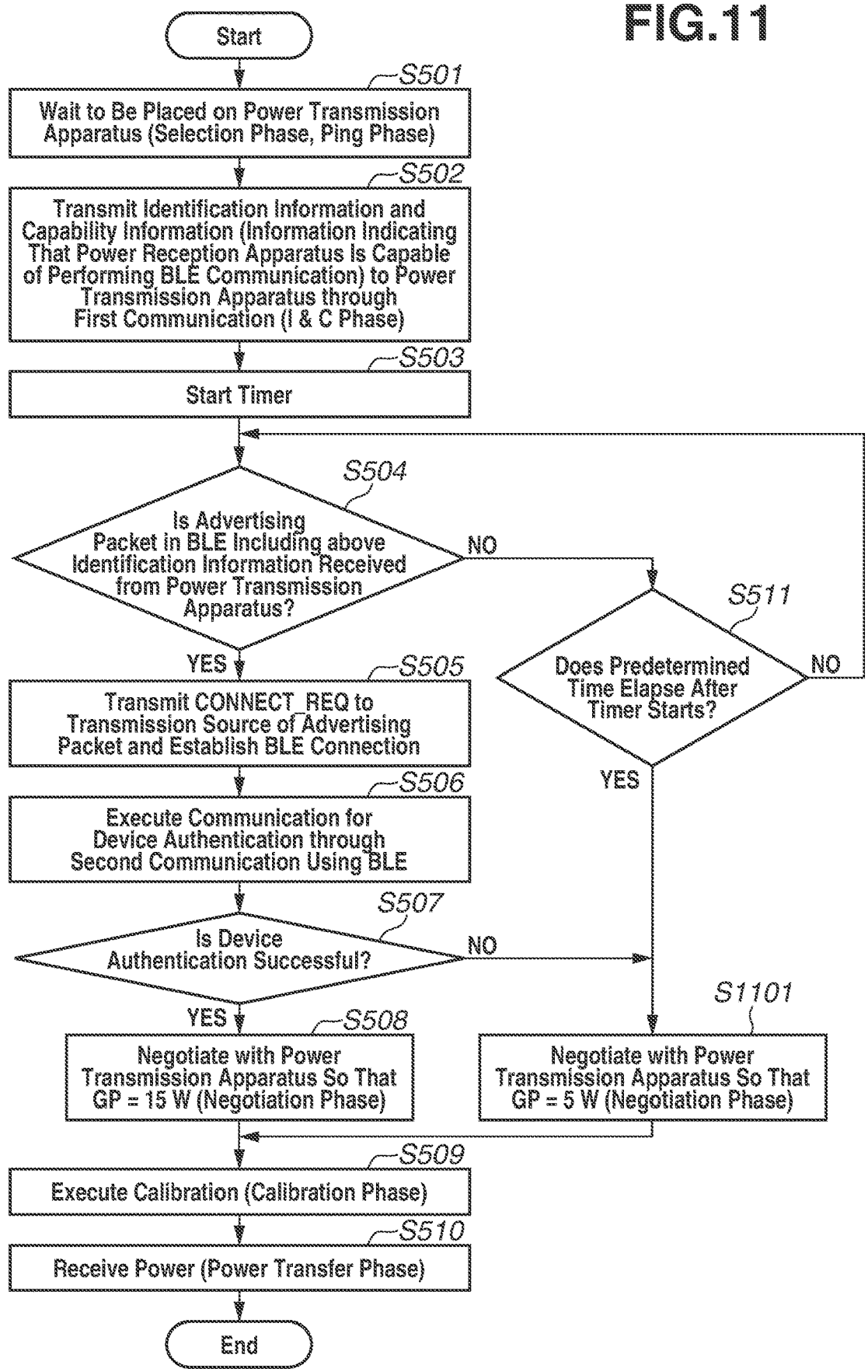
FIG. 11 is a flowchart illustrating an example of a flow of processing by a power reception apparatus according to a second exemplary embodiment.

As the present exemplary embodiment, a form is described in which the communication for device authentication is executed with only the TX 102 capable of performing BLE communication. BLE is merely an example, and the same applies to a case where another communication method is used as the second communication. FIG. 11 is a flowchart illustrating the flow of processing by the RX 101 according to the present exemplary embodiment. The differences from the first exemplary embodiment are described below.

After step S503, if the RX 101 according to the present exemplary embodiment does not receive an advertising packet in BLE from the TX 102 within the predetermined time (NO in step S504 and YES in step S511), then in step S1101, the RX 101 negotiates with the TX 102 so that the GP=5 watts. That is, in the first exemplary embodiment, if it is determined that the TX 102 is incapable of performing the second communication, the RX 101 performs device authentication through the first communication. In the present exemplary embodiment, however, this device authentication through the first communication is omitted. Consequently, with the TX 102 capable of performing the second communication faster than the first communication, the RX 101 can start receiving power based on the device authentication in a short time. With the TX 102 incapable of performing the second communication, the RX 101 can omit the device authentication, thereby starting receiving power in a short time. The GP may be not only 5 watts but also any other value smaller than that in a case where the device authentication is successful. The GP in a case where the device authentication is omitted may have a value that is the same as or a value different from that in a case where the device authentication fails.

Processes other than that of step S1101 are similar to those in the flowchart illustrated in FIG. 5, and therefore are not described.

Third Exemplary Embodiment

There is a case where the TX 102 compliant with the WPC standard or another standard but incapable of performing BLE communication performs control for processing a packet including information indicating that the RX 101 is capable of performing BLE communication, as an undefined or improper packet and refusing further communication or power transmission. The present exemplary embodiment addresses this issue.

Figure 12:
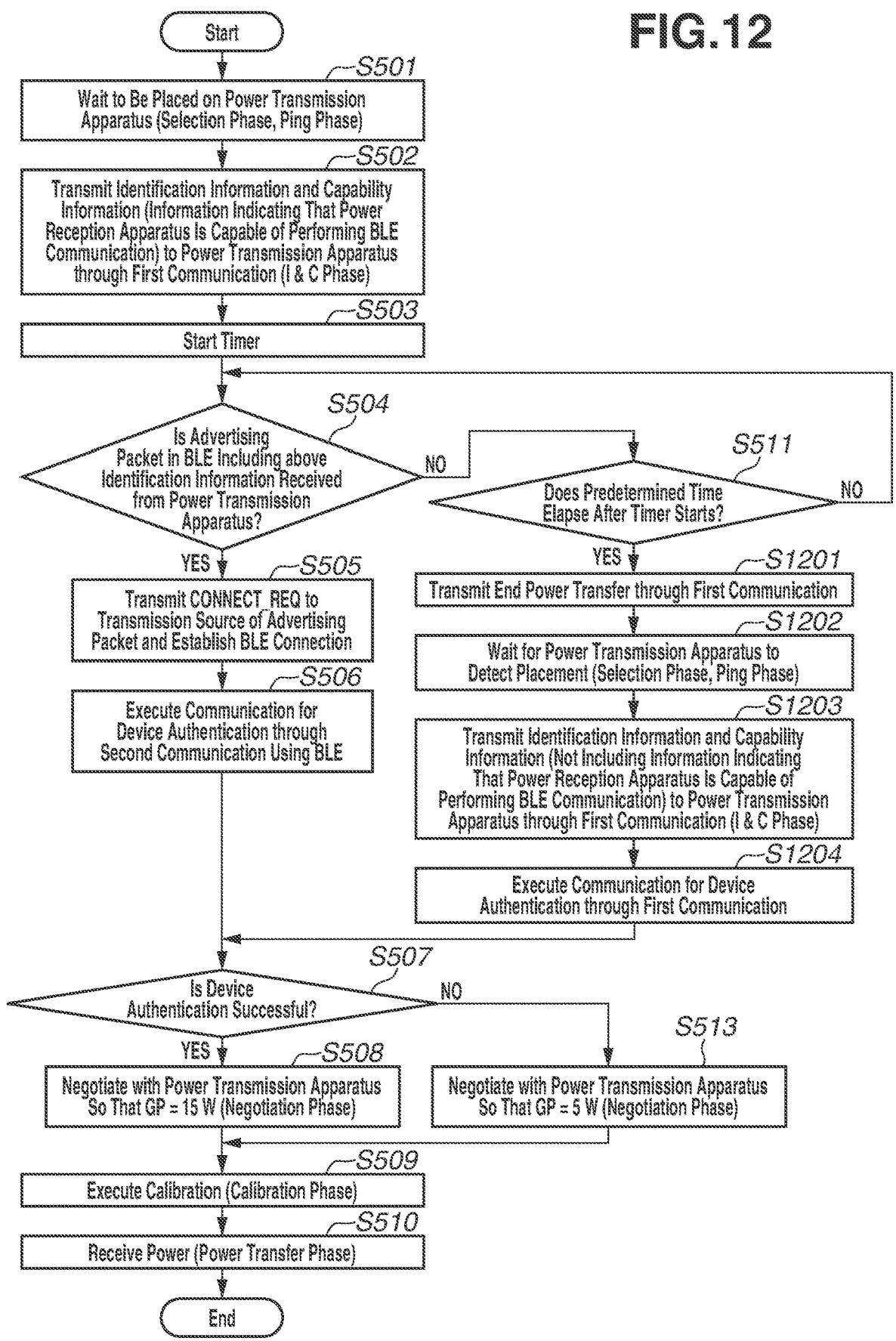
FIG. 12 is a flowchart illustrating an example of a flow of processing by a power reception apparatus according to a third exemplary embodiment.

In the present exemplary embodiment, a form is described in which the RX 101 performs control not to transmit information indicating that the RX 101 is capable of performing BLE communication to the TX 102 incapable of performing BLE communication in the I & C phase. BLE is merely an example, and the same applies to a case where another communication method is used as the second communication. FIG. 12 is a flowchart illustrating the flow of processing by the RX 101 according to the present exemplary embodiment. The differences from the first exemplary embodiment are described below.

After step S503, if the RX 101 according to the present exemplary embodiment does not receive an advertising packet in BLE from the TX 102 within the predetermined time (NO in step S504 and YES in step S511), the RX 101 performs the following processing. That is, in step S1201, the RX 101 transmits end power transfer to the TX 102 using the first communication. Consequently, the TX 102 returns to the selection phase (step S601). In step S1202, the RX 101 also returns to the selection phase. If the RX 101 is still placed on the TX 102 at this stage, both the RX 101 and the TX 102 immediately detect the placement.

In step S1203, in communication in the subsequent I & C phase, the RX 101 transmits the device configuration information (the capability information) by not including the information indicating that the RX 101 is capable of performing BLE communication. Then, in step S1204, the RX 101 executes device authentication through the first communication with the TX 102. That is, if it is determined that the TX 102 does not have the function of performing BLE communication, the RX 101 changes back the sequence based on the WPC standard to the initial state once and then performs control not to notify the TX 102 of the information indicating that the RX 101 is capable of performing BLE communication.

The processing in FIG. 12 is performed, thereby preventing an undefined packet from being transmitted to the TX 102 as described above. Thus, the RX 101 can normally receive power.

Processes other than those of steps S1201 to S1204 are similar to those in the flowchart illustrated in FIG. 5, and therefore are not described.

Fourth Exemplary Embodiment

Figure 13:
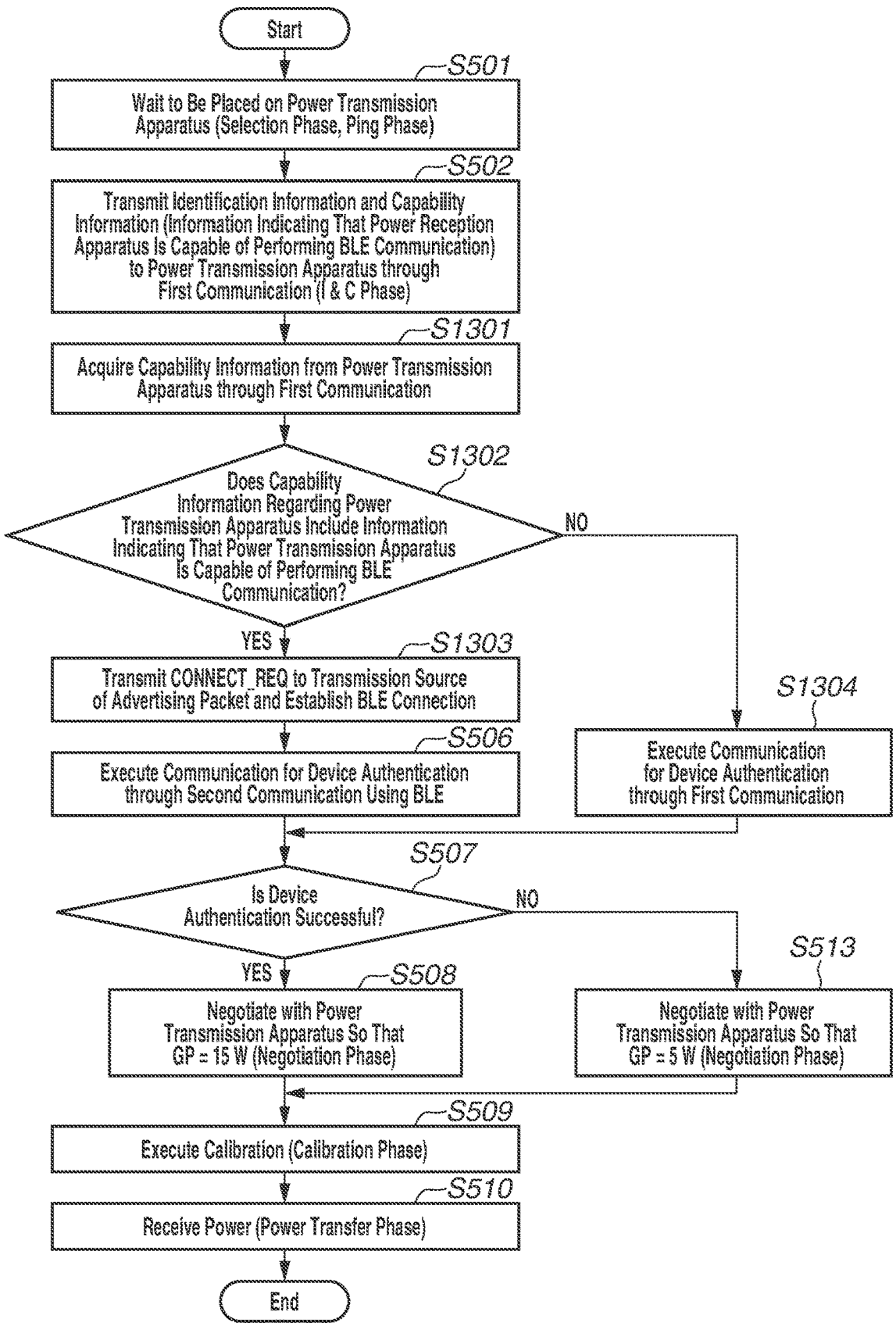
FIG. 13 is a flowchart illustrating an example of a flow of processing by a power reception apparatus according to a fourth exemplary embodiment.

As the present exemplary embodiment, a form is described in which the RX 101 acquires, from the TX 102 via the first communication unit 206, information indicating whether the TX 102 is capable of performing BLE communication. BLE is merely an example, and the same applies to a case where another communication method is used as the second communication. FIG. 13 is a flowchart illustrating the flow of processing by the RX 101 according to the present exemplary embodiment. The differences from the first exemplary embodiment are described below.

After step S502, then in step S1301, the RX 101 according to the present exemplary embodiment acquires capability information from the TX 102 through the first communication. The capability information regarding the TX 102 may be acquired using, for example, a power transmitter capability packet in the WPC standard, or may be acquired using another packet. The transmission of the capability information regarding the TX 102 may be performed using as a trigger the fact that the RX 101 requests through the first communication the TX 102 to transmit the capability information, or may be performed using a signal other than this request as a trigger.

Next, in step S1302, the RX 101 determines whether the capability information acquired from the TX 102 includes information indicating that the TX 102 is capable of performing BLE communication. If the acquired capability information includes the information indicating that the TX 102 is capable of performing BLE communication (YES in step S1302), then in step S1303, the RX 101 receives an advertising packet from the TX 102 and transmits CONNECT_REQ to BD_ADDR of the transmission source of the advertising packet. Then, the RX 101 and the TX 102 establish a BLE connection with each other. In step S1301, the RX 101 may acquire BD_ADDR from the TX 102 through the first communication, directly transmit CONNECT_REQ to the above BD_ADDR without waiting for an advertising packet, and establish a BLE connection with the TX 102.

If the capability information acquired from the TX 102 does not include the information indicating that the TX 102 is capable of performing BLE communication (NO in step S1302), then in step S1304, the RX 101 performs device authentication through the first communication. Processes other than those of steps S1301 to S1304 are similar to those in the flowchart illustrated in FIG. 5, and therefore are not described.

The above control is performed, whereby without waiting the predetermined time in step S511 in FIG. 5, the RX 101 can determine whether the TX 102 is capable of performing BLE communication. Thus, the RX 101 can start device authentication in a shorter time. This can shorten the time from the placement of the RX 101 to the start of power reception.

However, in a case where the TX 102 is using the second communication in another application, or in a case where the function of performing the second communication is off, the RX 101 may perform the device authentication through the first communication. For example, in FIG. 13, if an advertising packet is not received or the establishment of a BLE connection fails in step S1303, the processing may proceed to step S1304.

According to the present exemplary embodiment, based on information acquired from the TX 102 and indicating whether the TX 102 is capable of performing BLE communication, the RX 101 can determine whether the TX 102 is capable of performing BLE communication. According to this determination result, the selection unit 215 can select a communication unit to be used to perform device authentication.

Fifth Exemplary Embodiment

Figure 14:
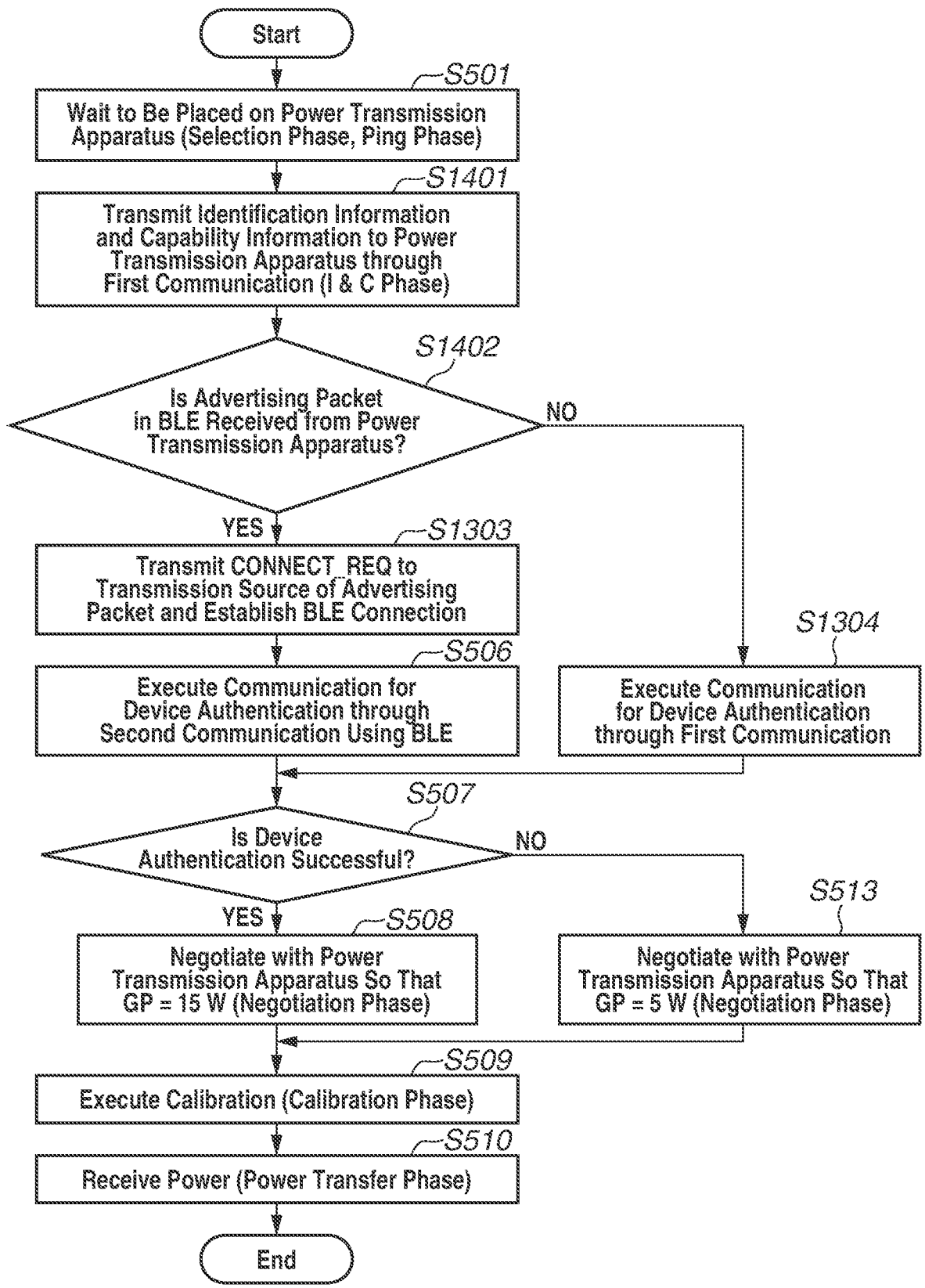
FIG. 14 is a flowchart illustrating an example of a flow of processing by a power reception apparatus according to a fifth exemplary embodiment.

In the fourth exemplary embodiment, a form has been described in which the RX 101 acquires, from the TX 102 through the first communication, information indicating whether the TX 102 is capable of performing BLE communication, then transmits CONNECT_REQ to the TX 102, and establishes a BLE connection with the TX 102. In the present exemplary embodiment, a form is described in which without acquiring, from the TX 102, information indicating that the TX 102 is capable of performing BLE communication, the RX 101 receives an advertising packet in BLE from the TX 102, then transmits CONNECT_REQ to the TX 102, and establishes a BLE connection with the TX 102. BLE is merely an example, and the same applies to a case where another communication method is used as the second communication. FIG. 14 is a flowchart illustrating the flow of processing by the RX 101 according to the present exemplary embodiment. The differences from the fourth exemplary embodiment are described below.

In the present exemplary embodiment, if the RX 101 detects that the RX 101 is placed on the charging stand 103 of the TX 102, then in step S1401, the RX 101 transmits identification information and device configuration information (capability information) to the TX 102 through the first communication. At this time, the RX 101 may or may not include, in the device configuration information (the capability information), information indicating that the RX 101 is capable of performing BLE communication.

Then, if the RX 101 receives an advertising packet in BLE from the TX 102 (YES in step S1402), then in step S1303, the RX 101 transmits CONNECT_REQ to the TX 102 through the second communication and establishes a BLE connection with the TX 102. Then, in step S506, the RX 101 performs device authentication on the TX 102 the second communication using BLE.

If, on the other hand, the RX 101 does not receive an advertising packet in BLE from the TX 102 (NO in step S1402), then in step S1304, the RX 101 performs the device authentication on the TX 102 through the first communication. The subsequent processing is similar to that in FIG. 13, and therefore is not described.

The determination of whether the RX 101 receives an advertising packet in BLE from the TX 102 in step S1402 may only need to be made before the device authentication through the first communication is performed. That is, in the present exemplary embodiment, on the premise that the device authentication through the first communication is performed, but if an advertising packet is received from the TX 102 before the device authentication through the first communication is performed, the device authentication through the second communication may be performed. To this end, the determination of whether the RX 101 receives an advertising packet in BLE from the TX 102 may be made between steps S501 and S1401. In this case, regardless of whether the RX 101 receives an advertising packet in BLE from the TX 102, the process of step S1401 may be executed first, and then, according to FIG. 14, the device authentication may be performed using either one of the first communication and the second communication.

According to the present exemplary embodiment, based on whether the TX 102 transmits an advertising packet, the RX 101 can determine whether the TX 102 is capable of performing BLE communication. According to this determination result, the selection unit 215 can select either of the first communication unit 206 and the second communication unit 207 as a communication unit to be used to perform device authentication.

Sixth Exemplary Embodiment

Figure 15:
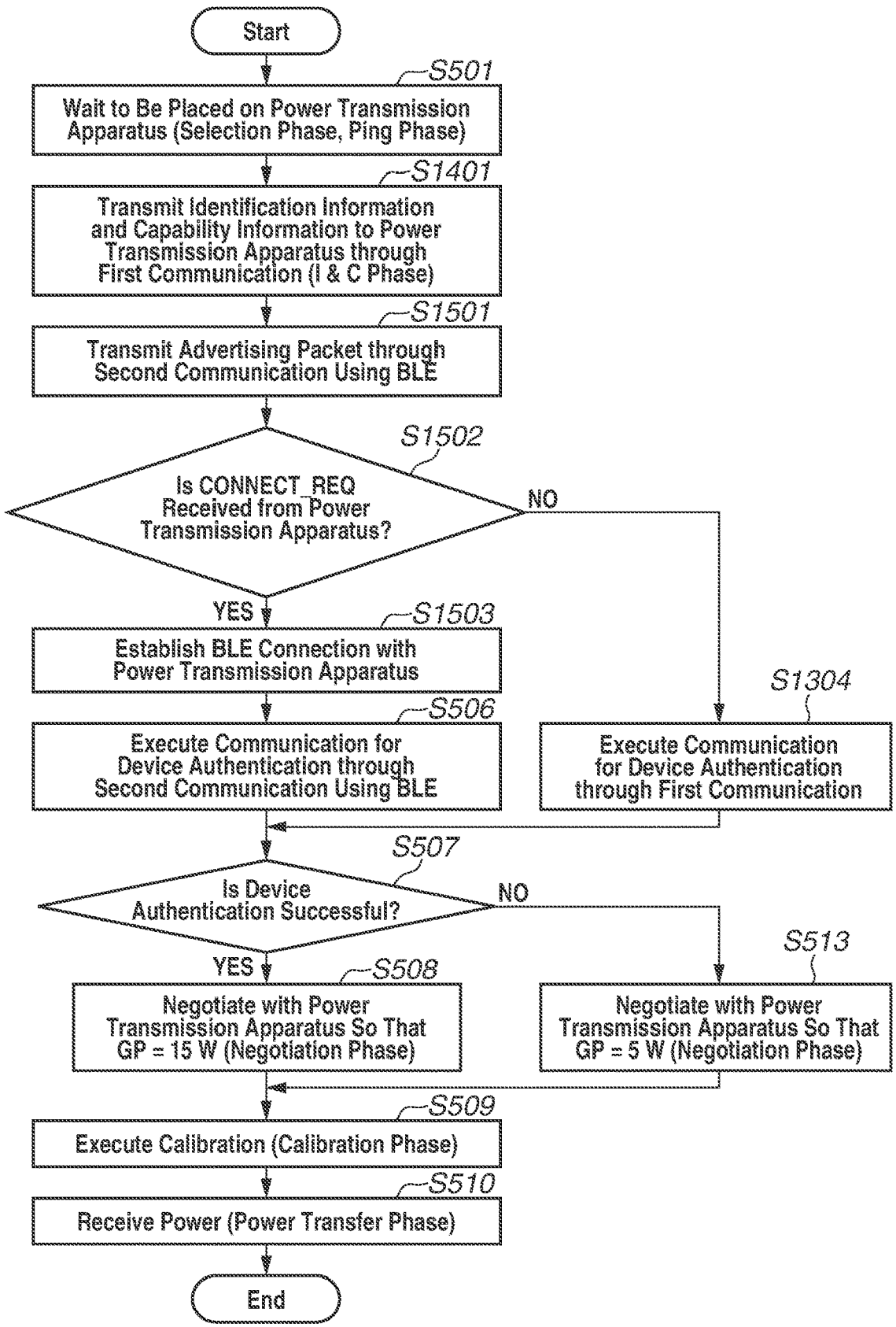
FIG. 15 is a flowchart illustrating an example of a flow of processing by a power reception apparatus according to a sixth exemplary embodiment.

In the fifth exemplary embodiment, a description has been given of processing in a configuration in which the TX 102 operates as a peripheral role in BLE, and the RX 101 operates as a central role in BLE. In the present exemplary embodiment, a description is given of an example of processing of power reception control in a case where these roles are reversed. BLE is merely an example, and the same applies to a case where another communication method is used as the second communication. FIG. 15 is a flowchart illustrating the flow of processing by the RX 101 according to the present exemplary embodiment. The differences from the fifth exemplary embodiment are described below.

In the present exemplary embodiment, if the RX 101 detects that the RX 101 is placed on the charging stand 103 of the TX 102, then in step S1401, the RX 101 transmits identification information and device configuration information (capability information) to the TX 102 through the first communication. At this time, the RX 101 may or may not include, in the device configuration information (the capability information), information indicating that the RX 101 is capable of performing BLE communication.

Next, in step S1501, the RX 101 transmits an advertising packet through the second communication using BLE. The advertising packet includes information for identifying the RX 101. The information may be, for example, identification information regarding the RX 101.

Then, in step S1502, the RX 101 determines whether CONNECT_REQ in response to the advertising packet is received from the TX 102. If the RX 101 receives CONNECT_REQ from the TX 102 (YES in step S1502), then in step S1503, the RX 101 establishes a BLE connection with the TX 102. Then, in step S506, the RX 101 performs device authentication on the TX 102 through the second communication using BLE.

If, on the other hand, the RX 101 does not receive CONNECT_REQ from the TX 102 (NO in step S1502), then in step S1304, the RX 101 performs the device authentication on the TX 102 through the first communication. The subsequent processing is similar to that in FIG. 14, and therefore is not described.

According to the present exemplary embodiment, based on the presence or absence of a connection request from the TX 102 in response to an advertising packet transmitted from the RX 101, the RX 101 can determine whether the TX 102 is capable of performing BLE communication. According to this determination result, the selection unit 215 can select a communication unit to be used to perform device authentication.

Other Exemplary Embodiments

The present disclosure can also be achieved by the process of supplying a program for achieving one or more functions of the above exemplary embodiments to a system or an apparatus via a network or a storage medium, and of causing one or more processors of a computer of the system or the apparatus to read and execute the program. The present disclosure can also be achieved by a circuit (e.g., an ASIC) for achieving the one or more functions.

At least a part of the flowcharts in FIGS. 5 to 7 and 11 to 15 may be achieved by hardware. In a case where a part of the flowcharts is achieved by hardware, for example, a dedicated circuit may be automatically generated on a field-programmable gate array (FPGA) using a predetermined compiler according to a program for achieving the steps. Alternatively, a gate array circuit may be formed similarly to the FPGA and achieved as hardware.

The present disclosure is not limited to the above embodiments and various changes and modifications can be made within the spirit and scope of the present disclosure. Therefore, to apprise the public of the scope of the present disclosure, the following claims are made.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to perform device authentication using appropriate communication.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power reception apparatus comprising:
a power reception unit configured to wirelessly receive power from a power transmission apparatus;
a plurality of communication units including at least a first communication unit configured to communicate with the power transmission apparatus, and a second communication unit configured to perform communication faster than the communication performed by the first communication unit;
an authentication unit configured to perform authentication on the power transmission apparatus, the authentication including processing for communicating information related to a certificate; and
a selection unit configured to, in a case where the power reception apparatus is capable of communicating with the power transmission apparatus using the second communication unit, select the second communication unit as a communication unit to be used for the authentication unit to perform the authentication, and in a case where the power reception apparatus is incapable of communicating with the power transmission apparatus using the second communication unit, select a communication unit configured to perform communication slower than the communication performed by the second communication unit as the communication unit to be used for the authentication unit to perform the authentication,
wherein the authentication unit performs the authentication performed using the communication unit selected by the selection unit.

2. The power reception apparatus according to claim 1, wherein in a case where the power reception apparatus is incapable of communicating with the power transmission apparatus using the second communication unit, the selection unit selects the first communication unit as the communication unit to be used for the authentication unit to perform the authentication.

3. The power reception apparatus according to claim 1, wherein the plurality of communication units further includes a third communication unit different from the first communication unit and the second communication unit and configured to perform communication faster than the communication performed by the first communication unit and slower than the communication performed by the second communication unit, and
wherein in a case where the power reception apparatus is incapable of communicating with the power transmission apparatus using the second communication unit, and in a case where the power reception apparatus is capable of communicating with the power transmission apparatus using the third communication unit, the selection unit selects the third communication unit as the communication unit to be used for the authentication unit to perform the authentication.

4. A power reception apparatus comprising:
a power reception unit configured to wirelessly receive power from a power transmission apparatus;

a first communication unit configured to perform communication for controlling the power reception with the power transmission apparatus;
a second communication unit configured to perform communication faster than the communication performed by the first communication unit; and
an authentication unit configured to perform authentication on the power transmission apparatus, the authentication including processing for communicating information related to a certificate,
wherein in a case where the power reception apparatus is capable of communicating with the power transmission apparatus using the second communication unit, the authentication unit performs the authentication using the second communication unit, and
wherein in a case where the power reception apparatus is incapable of communicating with the power transmission apparatus using the second communication unit, the authentication unit does not perform the authentication.

5. The power reception apparatus according to claim 1, further comprising a determination unit configured to determine whether the power reception apparatus is capable of communicating with the power transmission apparatus using the second communication unit.

6. The power reception apparatus according to claim 5,
wherein the first communication unit receives, from the power transmission apparatus, information indicating whether the power transmission apparatus has a function of communicating with the second communication unit, and
wherein based on the information received by the first communication unit, the determination unit determines whether the power transmission apparatus is capable of communicating with the second communication unit.

7. The power reception apparatus according to claim 5, wherein based on whether the second communication unit receives a packet from the power transmission apparatus, the determination unit determines whether the power reception apparatus is capable of communicating with the power transmission apparatus using the second communication unit.

8. The power reception apparatus according to claim 7, wherein the packet includes information for identifying the power reception apparatus.

9. The power reception apparatus according to claim 8, wherein the information identifying the power reception apparatus is transmitted to the power transmission apparatus by the first communication unit.

10. The power reception apparatus according to claim 1, wherein the first communication unit superimposes a signal on power wirelessly transmitted from the power transmission apparatus, thereby communicating with the power transmission apparatus.

11. The power reception apparatus according to claim 1, wherein a frequency of an electromagnetic wave used in the communication performed by the second communication unit is higher than a frequency of an electromagnetic wave used in the communication performed by the first communication unit.

12. A power transmission apparatus comprising:
a power transmission unit configured to wirelessly transmit power to a power reception apparatus;
a plurality of communication units including at least a first communication unit configured to communicate with the power reception apparatus, and a second communication unit configured to perform communication faster than the communication performed by the first communication unit;
an authentication unit configured to be subjected to authentication by the power reception apparatus, the authentication including processing for communicating information related to a certificate; and
a selection unit configured to, in a case where the power transmission apparatus is capable of communicating with the power reception apparatus using the second communication unit, select the second communication unit as a communication unit to be used for the authentication unit to be subjected to the authentication, and in a case where the power transmission apparatus is incapable of communicating with the power reception apparatus using the second communication unit, select a communication unit configured to perform communication slower than the communication performed by the second communication unit as the communication unit to be used for the authentication unit to be subjected to the authentication,
wherein the authentication unit performs the authentication performed using the communication unit selected by the selection unit.

13. The power transmission apparatus according to claim 12, wherein in a case where the power transmission apparatus is incapable of communicating with the power reception apparatus using the second communication unit, the selection unit selects the first communication unit as the communication unit to be used for the authentication unit to be subjected to the authentication.

14. The power transmission apparatus according to claim 12,
wherein the plurality of communication units further includes a third communication unit different from the first communication unit and the second communication unit and configured to perform communication faster than the communication performed by the first communication unit, and
wherein in a case where the power transmission apparatus is incapable of communicating with the power reception apparatus using the second communication unit, and in a case where the power transmission apparatus is capable of communicating with the power reception apparatus using the third communication unit, the selection unit selects the third communication unit as the communication unit to be used for the authentication unit to be subjected to the authentication.

15. The power transmission apparatus according to claim 12, further comprising a determination unit configured to determine whether the power transmission apparatus is capable of communicating with the power reception apparatus using the second communication unit.

16. The power transmission apparatus according to claim 15,
wherein the first communication unit receives, from the power reception apparatus, information indicating whether the power reception apparatus has a function of communicating with the second communication unit, and
wherein based on the information received by the first communication unit, the determination unit determines whether the power reception apparatus is capable of communicating with the second communication unit.

17. A control method for a power reception apparatus including a power reception unit configured to wirelessly receive power from a power transmission apparatus, and a plurality of communication units including at least a first communication unit configured to communicate with the power transmission apparatus, and a second communication unit configured to perform communication faster than the communication performed by the first communication unit, the control method comprising:
  performing authentication on the power transmission apparatus, the authentication including processing for communicating information related to a certificate; and
  in a case where the power reception apparatus is capable of communicating with the power transmission apparatus using the second communication unit, selecting the second communication unit as a communication unit to be used in the authentication to perform the authentication, and in a case where the power reception apparatus is incapable of communicating with the power transmission apparatus using the second communication unit, selecting a communication unit configured to perform communication slower than the communication performed by the second communication unit as the communication unit to be used in the authentication to perform the authentication,
  wherein the authentication is performed using the communication unit selected in the selection.

18. The control method according to claim 17, wherein in the selection, in a case where the power reception apparatus is incapable of communicating with the power transmission apparatus using the second communication unit, the first communication unit is selected as the communication unit to be used in the authentication to perform the authentication.

19. The control method according to claim 17,
  wherein the plurality of communication units further includes a third communication unit different from the first communication unit and the second communication unit and configured to perform communication faster than the communication performed by the first communication unit and slower than the communication performed by the second communication unit, and
  wherein in the selection, in a case where the power reception apparatus is incapable of communicating with the power transmission apparatus using the second communication unit, and in a case where the power reception apparatus is capable of communicating with the power transmission apparatus using the third communication unit, the third communication unit is selected as the communication unit to be used in the authentication to perform the authentication.

20. A control method for a power reception apparatus including a power reception unit configured to wirelessly receive power from a power transmission apparatus, a first communication unit configured to perform communication for controlling the power reception with the power transmission apparatus, and a second communication unit configured to perform communication faster than the communication performed by the first communication unit, the control method comprising:
  receiving power from the power transmission apparatus using the power reception unit; and
  performing authentication on the power transmission apparatus, the authentication including processing for communicating information related to a certificate,
  wherein in the authentication, in a case where the power reception apparatus is capable of communicating with the power transmission apparatus using the second communication unit, the authentication is performed using the second communication unit.

21. The control method according to claim 17, further comprising determining whether the power reception apparatus is capable of communicating with the power transmission apparatus using the second communication unit.

22. The control method according to claim 21, further comprising, using the first communication unit, receiving, from the power transmission apparatus, information indicating whether the power transmission apparatus has a function of communicating with the second communication unit,
  wherein in the determination, based on the information received in the reception, it is determined whether the power reception apparatus is capable of communicating with the power transmission apparatus using the second communication unit.

23. A control method for a power transmission apparatus including a power transmission unit configured to wirelessly transmit power to a power reception apparatus, and a plurality of communication units including at least a first communication unit configured to communicate with the power reception apparatus, and a second communication unit configured to perform communication faster than the communication performed by the first communication unit, the control method comprising:
  being subjected to authentication by the power reception apparatus, the authentication including processing for communicating information related to a certificate; and
  in a case where the power transmission apparatus is capable of communicating with the power reception apparatus using the second communication unit, selecting the second communication unit as a communication unit to be used in the authentication to be subjected to the authentication, and in a case where the power transmission apparatus is incapable of communicating with the power reception apparatus using the second communication unit, selecting a communication unit configured to perform communication slower than the communication performed by the second communication unit as the communication unit to be used in the authentication to be subjected to the authentication,
  wherein the authentication is performed using the communication unit selected in the selection.

24. The control method according to claim 23, wherein in the selection, in a case where the power transmission apparatus is incapable of communicating with the power reception apparatus using the second communication unit, the first communication unit is selected as the communication unit to be used in the authentication to be subjected to the authentication.

25. The control method according to claim 23,
  wherein the plurality of communication units further includes a third communication unit different from the first communication unit and the second communication unit and configured to perform communication faster than the communication performed by the first communication unit and slower than the communication performed by the second communication unit, and
  wherein in the selection, in a case where the power transmission apparatus is incapable of communicating with the power reception apparatus using the second communication unit, and in a case where the power transmission apparatus is capable of communicating with the power reception apparatus using the third communication unit, the third communication unit is selected as the communication unit to be used in the authentication to be subjected to the authentication.

26. The control method according to claim 23, further comprising determining whether the power transmission apparatus is capable of communicating with the power reception apparatus using the second communication unit.

27. The control method according to claim 26, further comprising, using the first communication unit, receiving, from the power reception apparatus, information indicating whether the power reception apparatus has a function of communicating with the second communication unit,
wherein in the determination, based on the information received in the reception, it is determined whether the power transmission apparatus is capable of communicating with the power reception apparatus using the second communication unit.

28. A non-transitory computer-readable storage medium storing a program for causing a computer to execute a control method for a power reception apparatus including a power reception unit configured to wirelessly receive power from a power transmission apparatus, and a plurality of communication units including at least a first communication unit configured to communicate with the power transmission apparatus, and a second communication unit configured to perform communication faster than the communication performed by the first communication unit, the control method comprising:
performing authentication on the power transmission apparatus, the authentication including processing for communicating information related to a certificate; and
in a case where the power reception apparatus is capable of communicating with the power transmission apparatus using the second communication unit, selecting the second communication unit as a communication unit to be used in the authentication to perform the authentication, and in a case where the power reception apparatus is incapable of communicating with the power transmission apparatus using the second communication unit, selecting a communication unit configured to perform communication slower than the communication performed by the second communication unit as the communication unit to be used in the authentication to perform the authentication,
wherein the authentication is performed using the communication unit selected in the selection.

29. A non-transitory computer-readable storage medium storing a program for causing a computer to execute a control method for a power transmission apparatus including a power transmission unit configured to wirelessly transmit power to a power reception apparatus, and a plurality of communication units including at least a first communication unit configured to communicate with the power reception apparatus, and a second communication unit configured to perform communication faster than the communication performed by the first communication unit, the control method comprising:
being subjected to authentication by the power reception apparatus, the authentication including processing for communicating information related to a certificate; and
in a case where the power transmission apparatus is capable of communicating with the power reception apparatus using the second communication unit, selecting the second communication unit as a communication unit to be used in the authentication to be subjected to the authentication, and in a case where the power transmission apparatus is incapable of communicating with the power reception apparatus using the second communication unit, selecting a communication unit configured to perform communication slower than the communication performed by the second communication unit as the communication unit to be used in the authentication to be subjected to the authentication,
wherein the authentication is performed using the communication unit selected in the selection.

30. The power reception apparatus according to claim 1, wherein the power reception unit receives power based on a result of the authentication performed using the communication unit selected by the selection unit.

31. The power reception apparatus according to claim 4, wherein power received by the power reception unit in a case where the authentication is not performed is smaller than power received by the power reception unit in a case where the authentication is successful.

32. The power transmission apparatus according to claim 12, wherein the power transmission unit transmits power based on a result of the authentication performed using the communication unit selected by the selection unit.

33. The control method according to claim 17, further comprising receiving, using the reception unit, power based on a result of the authentication performed using the communication unit selected in the selection.

34. The control method according to claim 20, wherein in the power reception, power received by the power reception unit in a case where the authentication is not performed is smaller than power in a case where the authentication is successful.

35. The control method according to claim 23, further comprising transmitting, using the power transmission unit, power based on a result of the authentication performed using the communication unit selected in the selection.

36. The power reception apparatus according to claim 1, wherein the communicating information related to certificate is transmitting a packet of GET_CERTIFICATE defined in a standard formulated by Wireless Power Consortium (WPC).

37. The power reception apparatus according to claim 1, wherein the communicating information related to certificate is transmitting a packet of GET_DIGESTS defined in a standard formulated by WPC.

38. The power reception apparatus according to claim 1, wherein the communicating information related to certificate is receiving a packet of CERTIFICATE defined in a standard formulated by WPC.

39. The power reception apparatus according to claim 1, wherein the communicating information related to certificate is receiving a packet of DIGESTS defined in a standard formulated by WPC.

40. The power reception apparatus according to claim 4, wherein the communicating information related to certificate is transmitting a packet of GET_CERTIFICATE defined in a standard formulated by WPC.

41. The power reception apparatus according to claim 4, wherein the communicating information related to certificate is transmitting a packet of GET_DIGESTS defined in a standard formulated by WPC.

42. The power reception apparatus according to claim 4, wherein the communicating information related to certificate is receiving a packet of CERTIFICATE defined in a standard formulated by WPC.

43. The power reception apparatus according to claim 4, wherein the communicating information related to certificate is receiving a packet of DIGESTS defined in a standard formulated by WPC.

44. The power transmission apparatus according to claim 12, the communicating information related to certificate is receiving a packet of GET_CERTIFICATE defined in a standard formulated by WPC.

45. The power transmission apparatus according to claim 12, the communicating information related to certificate is receiving a packet of GET_DIGESTS defined in a standard formulated by WPC.

46. The power transmission apparatus according to claim 12, the communicating information related to certificate is transmitting a packet of CERTIFICATE defined in a standard formulated by WPC.

47. The power transmission apparatus according to claim 12, the communicating information related to certificate is transmitting a packet of DIGESTS defined in a standard formulated by WPC.

* * * * *